United States Patent
Ishii et al.

(10) Patent No.: US 10,291,806 B2
(45) Date of Patent: May 14, 2019

(54) IMAGE READING DEVICE HAVING A FLAT CABLE THAT TRANSMITS/RECEIVES A SIGNAL TO/FROM THE SCANNER AND IMAGE FORMING APPARATUS

(71) Applicant: KYOCERA Document Solutions Inc., Osaka (JP)

(72) Inventors: Akira Ishii, Osaka (JP); Masuo Kawamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/854,212

(22) Filed: Dec. 26, 2017

(65) Prior Publication Data

US 2018/0183944 A1 Jun. 28, 2018

(30) Foreign Application Priority Data

Dec. 28, 2016 (JP) .................... 2016-256866

(51) Int. Cl.
*H04N 1/00* (2006.01)
*G03G 21/16* (2006.01)

(52) U.S. Cl.
CPC ....... *H04N 1/0083* (2013.01); *G03G 21/1619* (2013.01); *H04N 1/00559* (2013.01); *H04N 1/00798* (2013.01); *G03G 21/1661* (2013.01); *G03G 2215/00198* (2013.01); *G03G 2221/16* (2013.01)

(58) Field of Classification Search
CPC .................................... H04N 1/0083
USPC .......................................... 358/1.15
See application file for complete search history.

(56) References Cited

U.S. PATENT DOCUMENTS

| | | | | |
|---|---|---|---|---|
| 2001/0040705 A1* | 11/2001 | Yokota | ........... | H04N 1/0083 358/474 |
| 2006/0192833 A1* | 8/2006 | Samoto | ........... | B41J 29/02 347/108 |
| 2010/0110159 A1* | 5/2010 | Kawamoto | ........ | H04N 1/00519 347/224 |
| 2018/0183945 A1* | 6/2018 | Ogawa | ........... | G03G 15/605 |
| 2018/0183958 A1* | 6/2018 | Ishii | ........... | H04N 1/00708 |

* cited by examiner

*Primary Examiner* — Jacky X Zheng
(74) *Attorney, Agent, or Firm* — Wenderoth, Lind & Ponack, L.L.P.

(57) ABSTRACT

An image reading device includes a placing plate, a frame, a scanner, and a flat cable. The flat cable has a flat surface, has one end connected to a cable port provided in the scanner and the other end connected to the frame, and transmits/receives a signal to/from the scanner. The flat cable extends in the frame such that a width direction of the flat surface is along a direction perpendicular to a lower surface of the placing plate.

14 Claims, 24 Drawing Sheets

IMAGE READING DEVICE HAVING A FLAT CABLE THAT TRANSMITS/RECEIVES A SIGNAL TO/FROM THE SCANNER AND IMAGE FORMING APPARATUS

CROSS-REFERENCE TO RELATED APPLICATION

This application is based upon and claims the benefit of priority from Japanese Patent Application No. 2016-256866 filed on Dec. 28, 2016, the entire contents of which are incorporated herein by reference.

BACKGROUND

The technology of the present disclosure relates to an image reading device and an image forming apparatus including the same.

There has been known an image reading device in which a scanner having a reading unit extending in a main scanning direction is allowed to reciprocally move in a sub-scanning direction, so that an image of a document placed on a contact glass is read. In the image reading device, since a cable connected to the scanner is frequently bent according to the reciprocating movement of the scanner, a flat cable resistant to the bending is used for connection with the scanner.

SUMMARY

An image reading device according to one aspect of the present disclosure includes a placing plate, a box-like frame, a scanner, and a flat cable. On the placing plate, a document to be read is placed. The box-like frame supports the placing plate. The scanner has a reading mechanism extending in a main scanning direction. The scanner is reciprocally moved in a sub-scanning direction at a side of a lower surface opposite to an upper surface of the placing plate, on which the document is placed, in the frame. The flat cable has a flat surface. The flat cable has one end connected to a cable port provided in the scanner and the other end connected to the frame, and transmits/receives a signal to/from the scanner.

The flat cable extends in the frame such that a width direction of the flat surface is along a direction perpendicular to the lower surface of the placing plate.

An image forming apparatus according to another aspect of the present disclosure includes the aforementioned image reading device and an image forming unit that forms an image read by the aforementioned image reading device on a recording paper.

BRIEF DESCRIPTION OF THE DRAWINGS

FIG. 6 is viewed from a side provided with a cable port, FIG. 6 is viewed from above.

DETAILED DESCRIPTION

Hereinafter, an image reading device according to an example of an embodiment and an image forming apparatus including the same will be described with reference to the drawings.

Embodiment 1

Figure 1:
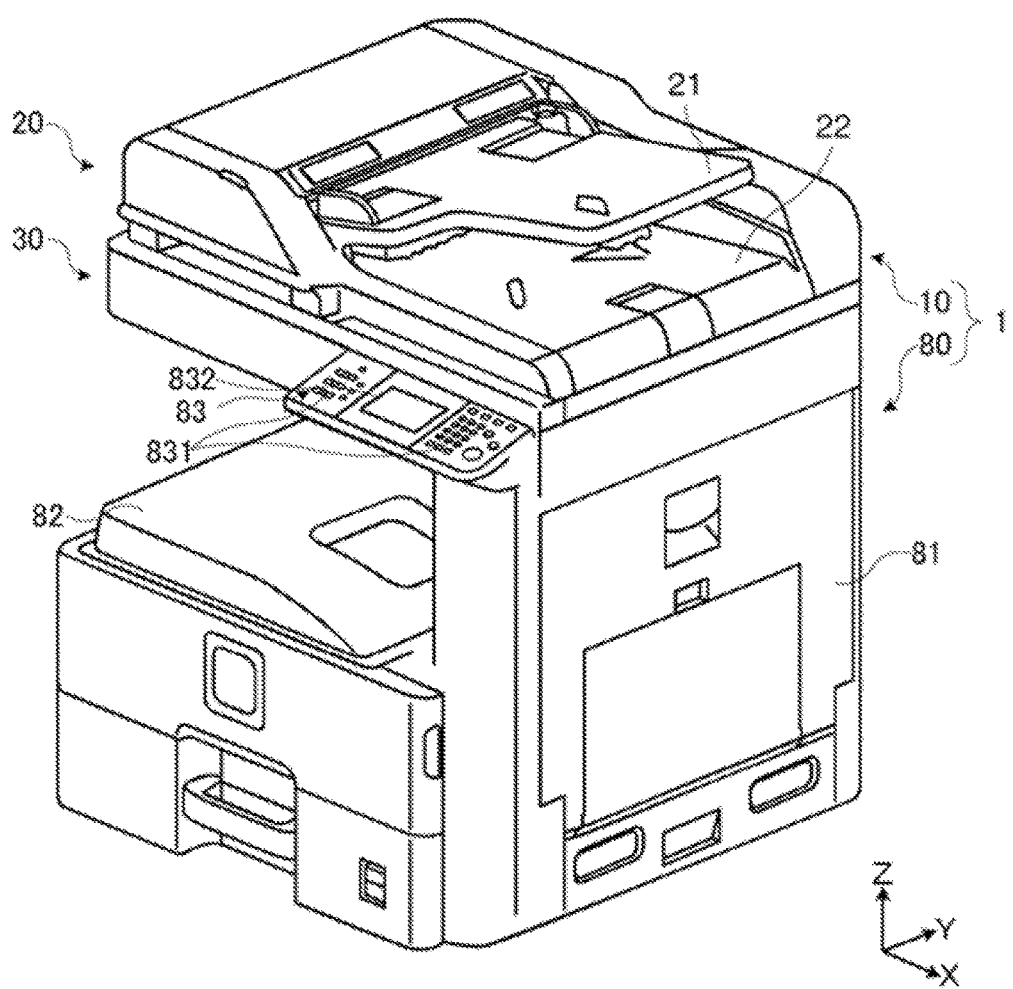
FIG. 1 is a perspective view illustrating an image forming apparatus including an image reading device according to an embodiment 1.
Figure 2:
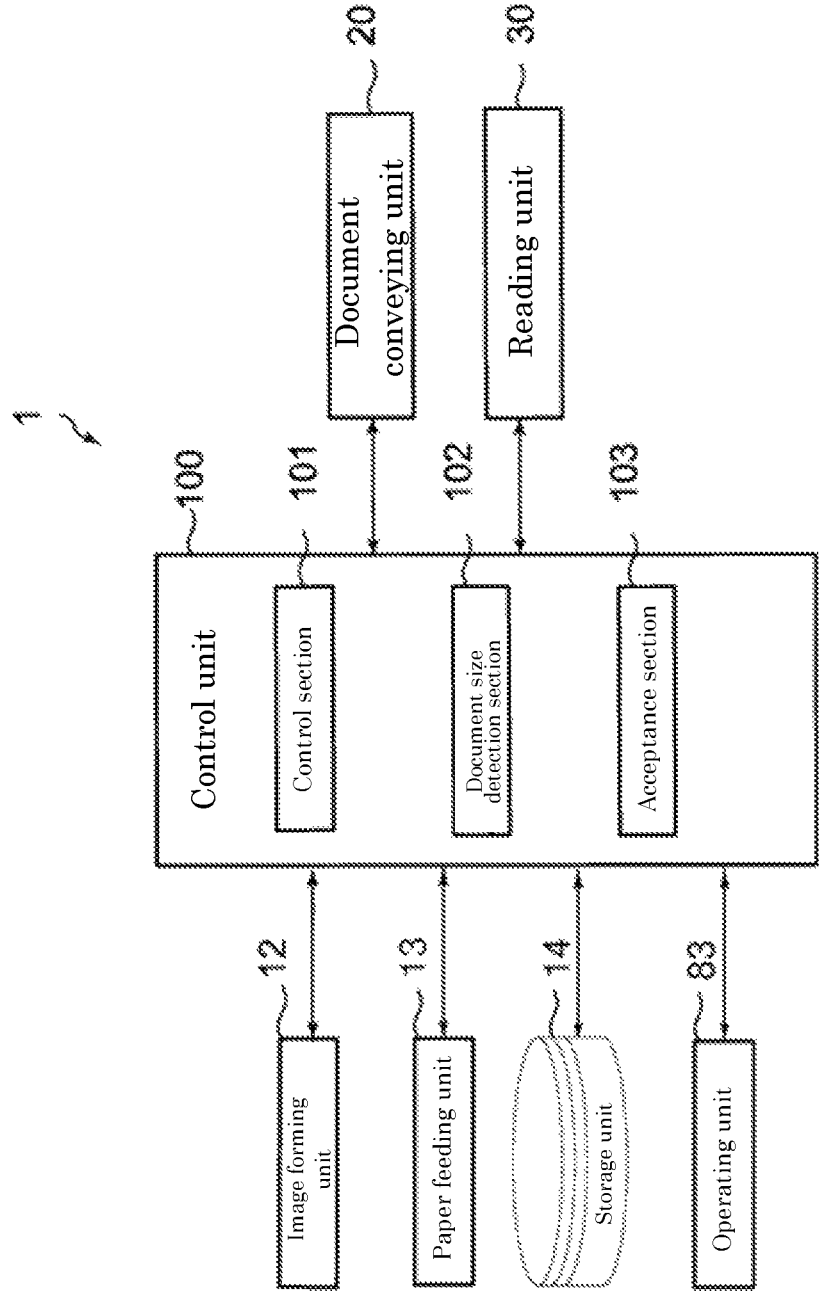
FIG. 2 is a functional block diagram illustrating a main internal configuration of an image forming apparatus including an image reading device according to an embodiment 1.

FIG. 1 is a perspective view illustrating an image forming apparatus including an image reading device according to an embodiment 1. FIG. 2 is a functional block diagram illustrating a main internal configuration of the image forming apparatus including the image reading device according to the embodiment 1.

As illustrated in FIG. 1, an image forming apparatus 1 schematically includes an apparatus body 80 and an image reading device 10 arranged above the apparatus body 80.

In a casing 81 forming a contour of the apparatus body 80, an image forming unit 12, a paper feeding unit 13 and the like illustrated in FIG. 2 are received. The image forming unit 12 includes a photosensitive drum (not illustrated), a charging device (not illustrated), an exposure device (not illustrated), a developing device (not illustrated) and the like, and forms a toner image of a document read by the image reading device on the photosensitive drum by charging, exposure, and developing processes. Thereafter, the image forming unit 12 transfers the toner image to a recording paper fed from the paper feeding unit 13, and discharges the recording paper subject to a fixing process to a discharge tray 82.

On the front surface of the casing 81 of the apparatus body 80, an operating unit 83 is arranged. The operating unit 83 includes a plurality of operating keys 831 such as a start key for instructing execution of an image reading job, and a display unit 832 including a liquid crystal display (LCD) and an organic electroluminescence (OLED: organic light emitting diode) display.

As illustrated in FIG. 2, the casing 81 further receives a storage unit 14 and a control unit 100 therein. The storage unit 14 is a large capacity storage device such as a hard disk drive (HDD), and stores image data generated by document reading of the image reading device 10, various programs and the like. The control unit 100 includes a central processing unit (CPU), a random access memory (RAM), a read only memory (ROM) and the like. The programs stored in the aforementioned ROM and storage unit 14 and the like are executed by the aforementioned CPU, so that the control unit 100 serves as a control section 101, a document size detection section 102, and an acceptance section 103.

The control section 101 has a function of controlling an image forming operation of the image forming apparatus 1 and an image reading operation of the image reading device 10. The document size detection section 102 has a function of detecting sizes of documents placed on a placing plate (a contact glass) 32 (see FIG. 3) to be described later. The acceptance section 103 has a function of accepting various instructions such as an image forming instruction and an image reading instruction on the basis of user operations using the operating unit 83 and the like. The placing plate 32 is a transparent plate-like member and is made of a material including resin or glass.

As illustrated in FIG. 1, the image reading device 10 includes a reading unit 30 and a document conveying unit 20 arranged above the reading unit 30. The document conveying unit 20 conveys a document placed on a document placing table 21 toward the placing plate 32. The document conveyed to the placing plate 32 is read by a scanner 40 (see FIG. 3), which will be described later, at a prescribed document reading position, and then is discharged to a document discharge unit 22.

Furthermore, the document conveying unit 20 is provided to be freely openable and closable to a principal surface of the placing plate 32, and also serves as a document pressing member that presses the document placed on the placing plate 32.

Figure 3:
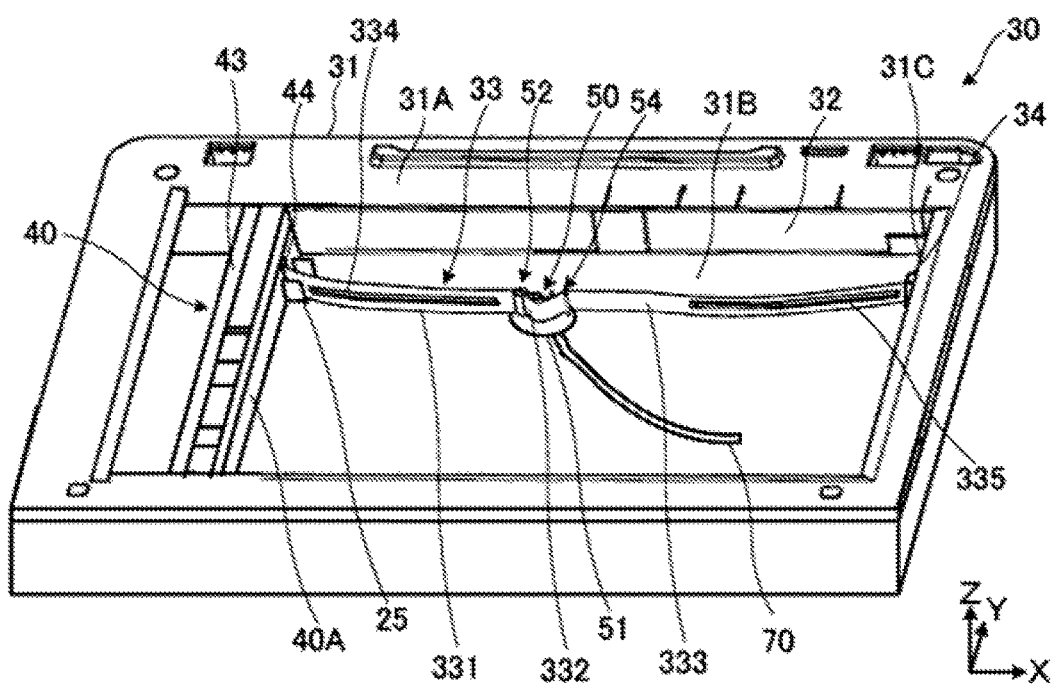
FIG. 3 is a perspective view illustrating a reading unit of an image reading device according to an embodiment 1.

FIG. 3 is a perspective view illustrating the reading unit 30. As illustrated in FIG. 3, the reading unit 30 includes a box-like casing 31. An upper surface 31A (a surface facing the document conveying unit 20 in a closed state of the document conveying unit 20) of the casing 31 is provided with an opening, wherein the placing plate 32 is mounted in the opening.

At a lower surface side of the placing plate 32, which is an opposite side of the upper surface on which a document is placed, the scanner 40 is provided. The scanner 40 has a reading mechanism 43 including a CIS (Contact Image Sensor) type reading sensor extending in a main scanning direction (a Y direction of the drawing). Since the CIS type reading sensor has a shallow depth of field, the reading mechanism 43 closely contacts with the lower surface of the placing plate 32 via a slider (not illustrated). In this state, the scanner 40 is reciprocally moved in the casing 31 in a sub-scanning direction (an X direction of the drawing) by a driving unit (not illustrated) including a motor and a gear. The example of FIG. 3 illustrates the case where the scanner 40 is positioned at a prescribed home position (an end portion of a minus X direction side of the drawing). When the acceptance section 103 accepts a document reading instruction, the scanner 40 is moved to a plus X direction of the drawing from the home position and reads the document placed on the placing plate 32 under the control of the control section 101. Then, when the document reading is completed, the scanner 40 is moved to the minus X direction of the drawing and returns to the home position.

The reading mechanism 43 includes a light emitting unit (not illustrated) including a plurality of LEDs of a red LED, a green LED, and a blue LED, and the like, and a light receiving unit (not illustrated) such as a complementary metal oxide semiconductor (CMOS) image sensor and the like. The scanner 40 irradiates light toward a document to be read while switching light of three colors of red, green, and blue by the light emitting unit, and receives reflected light reflected from the document by the light receiving unit. The light receiving unit converts the received light into an electrical signal and acquires image data corresponding to one line of the main scanning direction.

The scanner 40 is electrically connected to the control unit 100 including the control section 101, which controls the image reading operation of the scanner 40, via a flat cable 33. Among the side surfaces of the scanner 40, on a side surface 40A positioned at a side (the plus X direction side of the drawing) provided with a casing fixing part 34 to be described later, a cable port 44 is provided to extend in a direction perpendicular to the lower surface of the placing plate 32. More specifically, the cable port 44 is provided at an end portion of one side (the plus Y direction) of the side surface 40A in the main scanning direction. One end of the flat cable 33 is connected to the cable port 44, and image data acquired by the scanner 40 is transmitted to the control section 101 via the flat cable 33. The control section 101 performs various types of image processing, such as digitalization, shading correction, Gamma correction, chromatic aberration correction, modulation transfer function (MTF) correction, and scanner color correction, on the image data transmitted from the scanner 40. Then, image data generated by the image processing is stored in the storage unit 14 and the like.

The flat cable 33 transmits power for driving the scanner 40, a control signal for controlling the image reading operation of the scanner 40, and the like, as well as the aforementioned image data.

The flat cable 33 is a ribbon-like cable in which a plurality of core wires arranged at constant intervals are covered by a resin film. The flat cable 33 has a characteristic capable of maintaining an electrical characteristic regardless of its deformation, and is preferable as a cable for connecting to the scanner 40 that reciprocally moves. The flat cable 33 is provided at one end thereof with a socket fitted into the cable port 44, and is provided at the other end thereof with a socket fitted into a pin header (not illustrated) provided to the control unit 100.

Among the side surfaces of the casing 31, on a side surface 31C positioned at an opposite end portion (the plus X direction of the drawing) of the home position of the scanner 40 in the sub-scanning direction, the casing fixing part 34 (a frame fixing part) is provided to fix the other end of the flat cable 33 to the casing 31. The casing fixing part 34, for example, is a clip holder, and fixes the other end of the flat cable 33 such that the width direction of a flat surface of the flat cable 33 is along (in parallel with) the direction perpendicular to the lower surface of the placing plate 32.

Figure 4A:
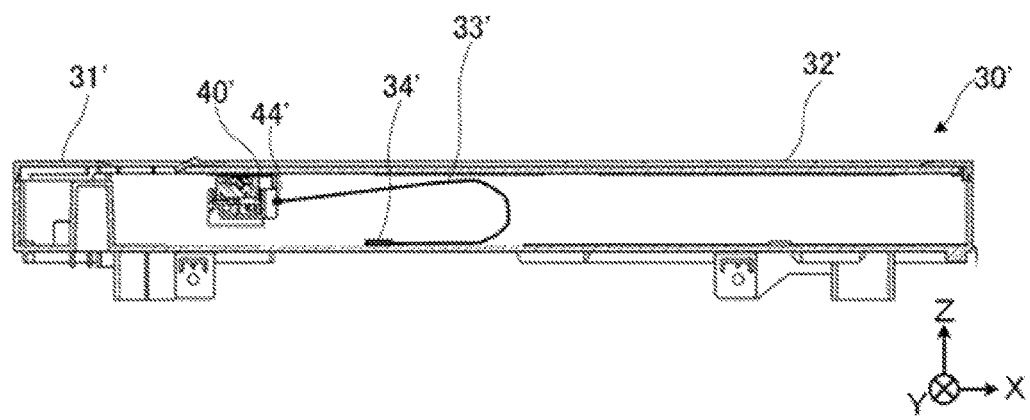
FIG. 4A and FIG. 4B are diagrams illustrating aspects in which a flat cable is deformed in a general image reading device.
Figure 4B:
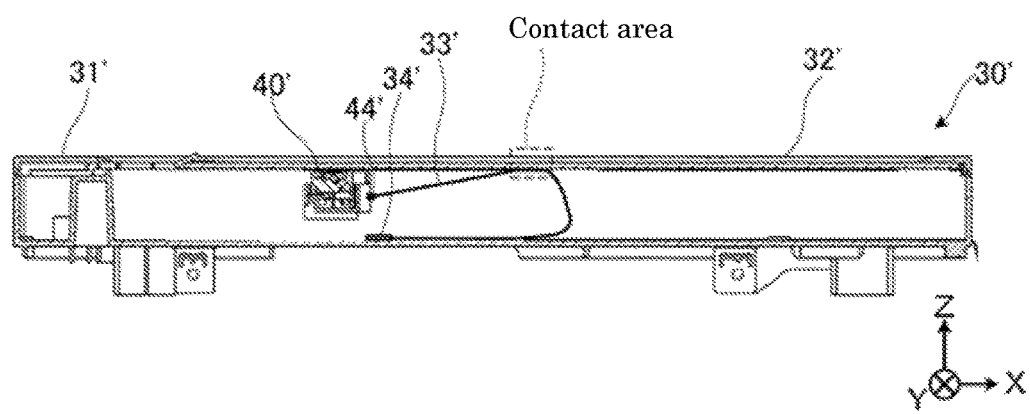

In a general image reading device as illustrated in FIG. 4A and FIG. 4B, a flat cable 33' extends in a casing 31' in a state in which a flat surface of the flat cable 33' is along a lower surface of a placing plate 32' by a cable port 44' and a casing fixing part 34' extending in the main scanning direction. In this case, since the flat cable 33' draws a large arc and swells up (a plus Z direction of the drawings) to be bent according to the position of a scanner 40', a part of the flat cable 33' may contact with the placing plate 32'.

Particularly, when the scanner 40' is moved from the position illustrated in FIG. 4A to the position illustrated in FIG. 4B and is positioned above the casing fixing part 34', since one end and the other end of the flat cable 33' are close to each other, a part of the flat cable 33' easily contacts with the placing plate 32'. When the flat cable 33' contacts with the placing plate 32', since the flat cable 33' is stuck to the placing plate 32', the placing plate 32' may become dirty.

However, in the image reading device 10 according to the embodiment 1, the flat cable 33 is allowed to extend in the casing 31 such that the width direction of its flat surface is along the direction perpendicular to the lower surface of the placing plate 32. In this way, even when the flat cable 33 is deformed with the movement of the scanner 40, the flat cable 33 does not contact with the placing plate 32.

Furthermore, in the image reading device 10 according to the embodiment 1, a slide member 50 is provided to guide deformation of the flat cable 33 in the casing 31. Hereinafter, a detailed configuration of the slide member 50 will be described.

As illustrated in FIG. 3, on a lower surface 31B of the casing 31, a slide path 70 including a groove recessed from the lower surface 31B is formed. The slide path 70 is formed to draw an arc toward the minus Y direction side of the drawing and the minus X direction side of the drawing. In other words, the slide path 70 is formed to draw an arc toward the other side opposite to one side (the plus Y direction of the drawing) in the main scanning direction, at which the cable port 44 is provided, in the side surface 40A of the scanner 40 and a side at which the home position is provided in the sub-scanning direction. Along the slide path 70, the slide member 50 is provided so as to slidably move on the lower surface 31B of the casing 31.

Figure 5A:
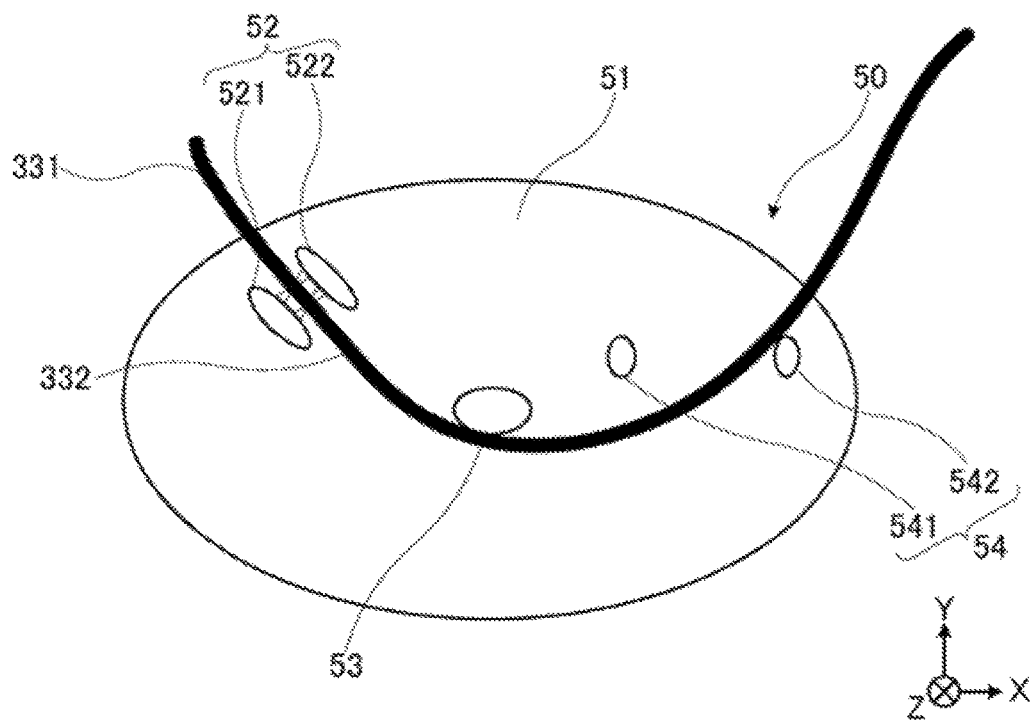
FIG. 5A and FIG. 5B are diagrams illustrating a configuration of a slide member of an image reading device according to an embodiment 1.
Figure 5B:
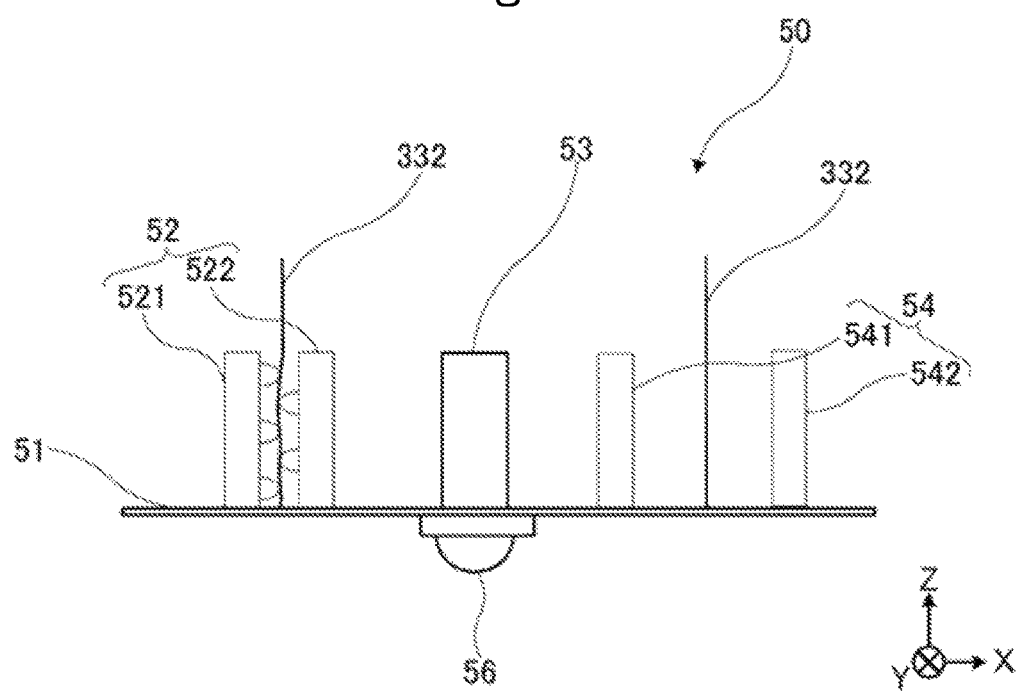

FIG. 5A and FIG. 5B are diagrams illustrating a configuration of the slide member 50. As illustrated in these drawings, the slide member 50 includes a flat plate-like base part 51 having an oval plane. At a center part of a surface of the base part 51, which faces the lower surface 31B of the casing 31, a hemispherical fitting part 56 is formed to protrude toward the lower surface 31B side (the minus Z direction of the drawing) of the casing 31. The fitting part 56 is fitted into the groove of the slide path 70, so that the slide member 50 can slidably move along the slide path 70.

On a surface opposite to the surface on which the fitting part 56 of the base part 51 is formed, a locking part 52, a hooking part 53, and an insertion part 54 are formed to protrude toward the lower surface side (the plus Y direction of the drawing) of the placing plate 32.

The locking part 52 includes a first wall portion 521 and a second wall portion 522 arranged opposite to each other and having a columnar shape. Between the first wall portion 521 and the second wall portion 522, a curved portion 332 is held, wherein the curved portion 332 is positioned between a first extension portion 331 of the flat cable 33, which extends from one end of the flat cable 33 connected to the cable port 44, and a second extension portion 333 of the flat cable 33, which extends from the other end of the flat cable 33 fixed by the casing fixing part 34. Each of the first wall portion 521 and the second wall portion 522 is provided on an opposite surface thereof with a plurality of protrusions, and the curved portion 332 is held by the protrusions, so that the flat cable 33 is locked. When the flat cable 33 is deformed according to the reciprocating movement of the scanner 40, force is transmitted from the curved portion 332 of the flat cable 33 to the locking part 52. The slide member 50 is slidably moved along the slide path 70 by the force transmitted to the locking part 52.

The hooking part 53 is formed at a center part of a surface opposite to the surface on which the fitting part 56 is formed, that is, at an opposite position while interposing the base part 51 between the hooking part 53 and the fitting part 56. The hooking part 53 is a columnar member and the curved portion 332 of the flat cable 33 is hooked to a peripheral surface of the hooking part 53.

The insertion part 54 includes a third wall portion 541 and a fourth wall portion 542 arranged opposite to each other and having a columnar shape. The third wall portion 541 and the fourth wall portion 542 are juxtaposed with each other at an interval corresponding to a length equal to or more than the thickness of the flat cable 33, and the flat cable 33 positioned at the other end side from the curved portion 332 is inserted between the third wall portion 541 and the fourth wall portion 542.

The fitting part 56 fitted into the groove of the slide path 70 is formed in the hemispherical shape, so that the slide member 50 can slidably move along the slide path 70 and a direction can be changed about the fitting part 56 in a direction following the lower surface 31B of the casing 31. That is, by force transmitted to the locking part 52 from the curved portion 332 of the flat cable 33 according to the reciprocating movement of the scanner 40, the slide member 50 is slidably moved on the lower surface 31B of the casing 31 and a direction can be changed in the direction following the lower surface 31B.

Figure 6:
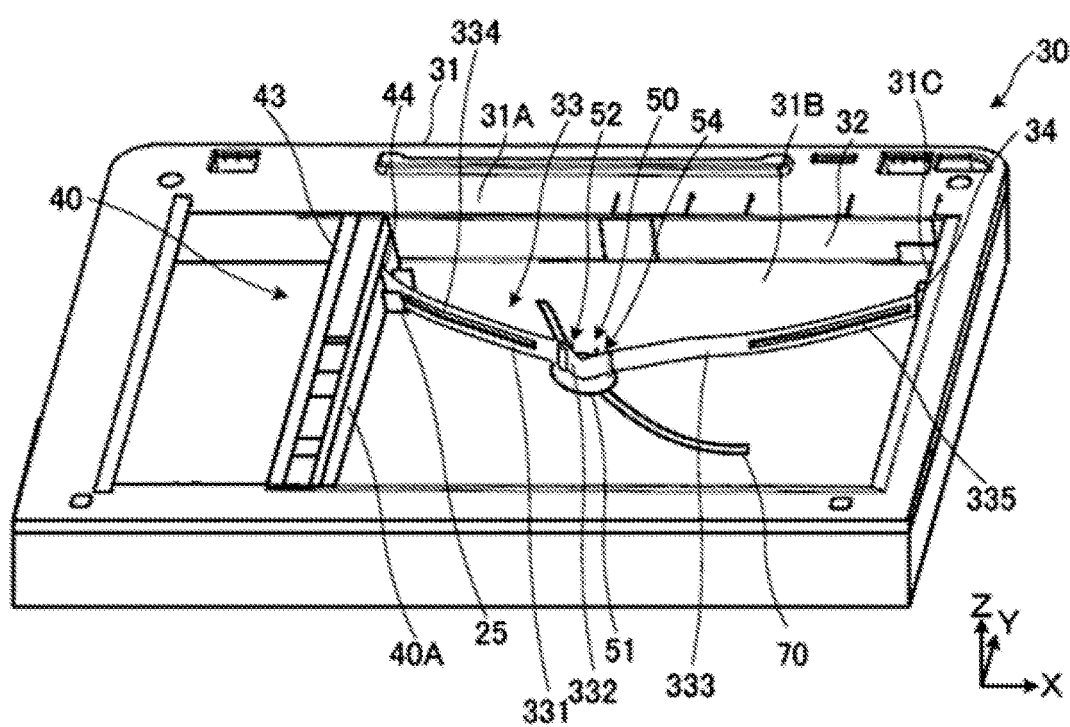
FIG. 6 is a diagram illustrating a state in which a scanner illustrated in FIG. 3 is moved from a home position.

FIG. 6 is a diagram illustrating a state in which the scanner 40 illustrated in FIG. 3 is moved from the home position to the side (the plus X direction of the drawing) provided with the casing fixing part 34. As illustrated in the drawing, when the scanner 40 is moved to the plus X direction of the drawing from the home position illustrated in FIG. 3, the flat cable 33 is moved to the plus X direction according to the movement of the scanner 40 to the plus X direction. Since the flat cable 33 has a constant Young's modulus (stiffness), force in the plus X direction is transmitted from the curved portion 332 of the flat cable 33 to the locking part 52 at the time of the aforementioned movement. By this force, the slide member 50 is moved from the position illustrated in FIG. 3 to the minus Y direction side of the drawing and the minus X direction side of the drawing along the slide path 70 as illustrated in FIG. 6. Furthermore, by the force in the plus X direction, which is transmitted from the curved portion 332 of the flat cable 33 to the locking part 52, the slide member 50 rotates about the fitting part 56 along the lower surface 31B of the casing 31. In this way, the direction of the slide member 50 is changed to a direction as illustrated in FIG. 6.

Figure 7A:
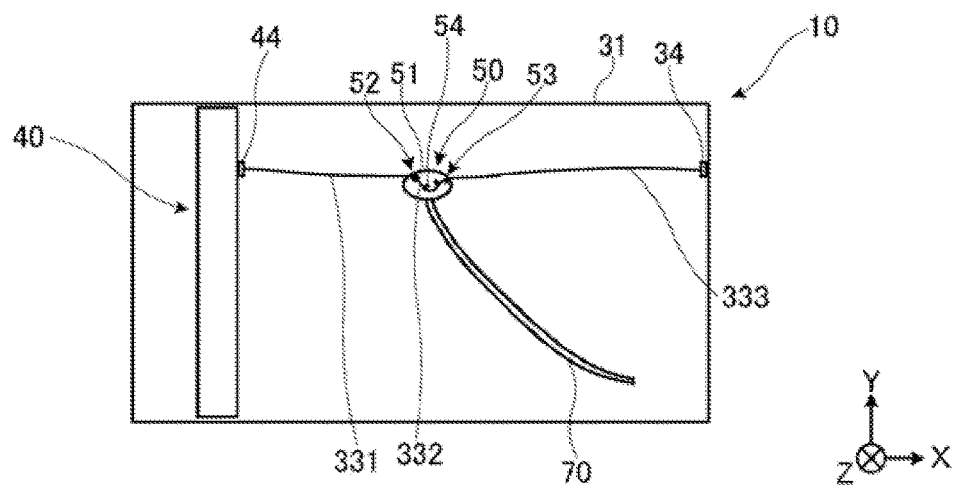
FIG. 7A is a diagram when a reading unit illustrated in FIG. 3 is viewed from above.
Figure 7B:
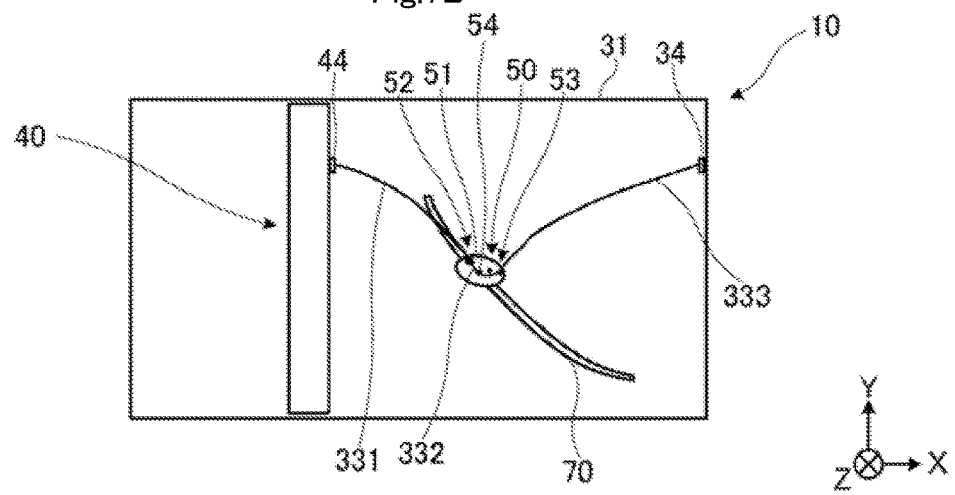
FIG. 7B is a diagram when a reading unit illustrated in FIG. 6 is viewed from above.
Figure 7C:
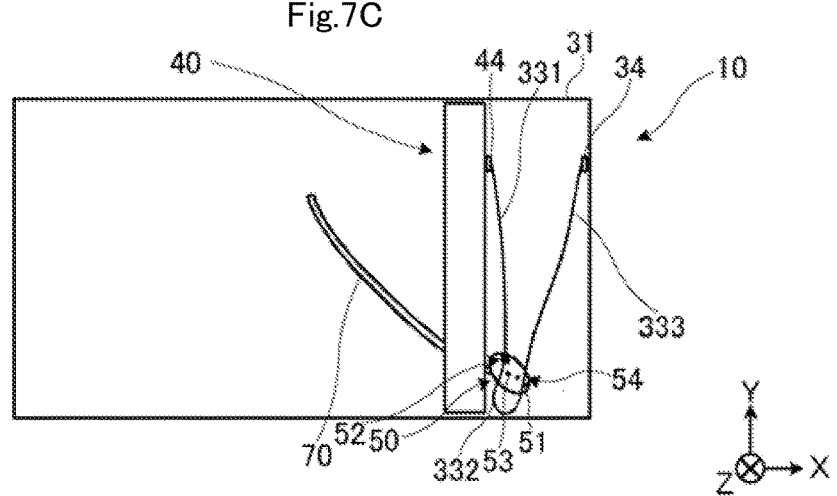
FIG. 7C is a diagram illustrating a state in which a scanner is moved from a position illustrated in FIG. 7B.

A description will be further provided using FIG. 7A to FIG. 7C. FIG. 7A is a diagram when the drawing illustrated in FIG. 3 is viewed from above (the plus Z direction), and FIG. 7B is a diagram when the drawing illustrated in FIG. 6 is viewed from above. FIG. 7C is a diagram illustrating a state in which the scanner 40 is further moved to the side (the plus X direction of the drawing) provided with the casing fixing part 34 from a state in illustrated in FIG. 7B. As illustrated in FIG. 7C, when the scanner 40 is further moved in the plus X direction of the drawing from the position illustrated in FIG. 7B, since the flat cable 33 is moved to the plus X direction, force in the plus X direction is transmitted from the curved portion 332 of the flat cable 33 to the locking part 52. By the force, the slide member 50 is further moved from the position illustrated in FIG. 7B to the minus Y direction side of the drawing and the minus X direction side of the drawing along the slide path 70 as illustrated in FIG. 7C. Furthermore, by the force in the plus X direction, which is transmitted from the curved portion 332 of the aforementioned flat cable 33 to the locking part 52, the slide member 50 further rotates about the fitting part 56 along the lower surface 31B of the casing 31.

As described above, the position and the direction of the slide member 50 are changed according to the movement of the scanner 40. In this way, deformation (a way of a direction and bending) of the flat cable 33 in the casing 31 is guided. For example, as with the state illustrated in FIG. 7C, when the scanner 40 approaches the casing fixing part 34, deformation of the flat cable 33 is guided such that the flat cable 33 largely swells to be bent to the minus Y direction side of the drawing. In this way, even when the scanner 40 approaches the casing fixing part 34, the flat cable 33 does not contact with the casing 31.

When the slide member 50 as described above is not provided, there is a case where the flat cable 33 is bent in the casing 31 in an inappropriate direction according to the movement of the scanner 40. For example, in FIG. 3 and FIG. 6, when the flat cable 33 swells to be bent to the plus Y direction side of the drawings, the flat cable 33 contacts with a side surface of the casing 31. In this case, the flat cable 33 may become tangled and the movement of the scanner 40 may be obstructed. In this regard, in accordance with the image reading device 10 according to the embodiment 1, deformation of the flat cable 33 in the casing 31 can be guided in an appropriate direction, so that it is possible to prevent the movement of the scanner 40 from being obstructed due to contact of the flat cable 33 to a side surface of the casing 31.

Modification Example 1

Figure 8:
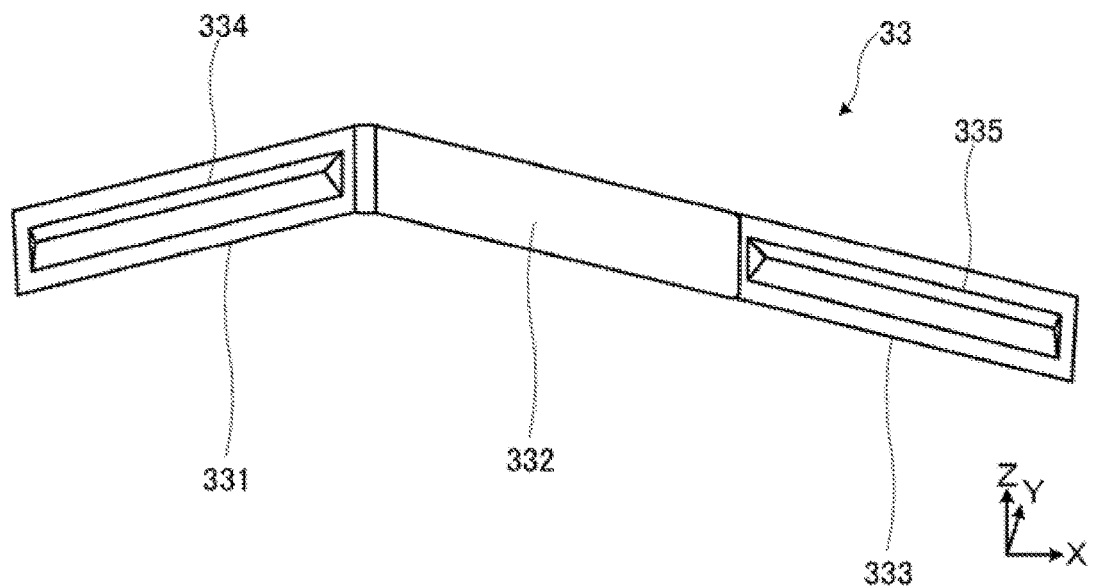
FIG. 8 is a diagram illustrating a detailed configuration of a flat cable illustrated in FIG. 3 and FIG. 6.

FIG. 8 is a diagram illustrating a detailed configuration of the flat cable 33 illustrated in FIG. 3 and FIG. 6. As illustrated in the drawing, the flat cable 33 is provided with protruding parts 334 and 335 formed by allowing a part of the flat surface to protrude in a direction perpendicular to the flat surface. When the protruding parts 334 and 335 are formed, the Young's modulus of the flat cable 33 with respect to the width direction of the flat surface is increased, so that it is possible to arrange the flat cable 33 such that the width direction of the flat surface follows the direction perpendicular to the lower surface of the placing plate 32.

The protruding parts 334 and 335 are formed by deforming a resin film of the flat cable 33 by using a mold and the like. Furthermore, a plurality of core wires included in the flat cable 33 are juxtaposed in the width direction (the Z direction of the drawing) of the flat surface while avoiding the protruding parts 334 and 335. That is, the core wires are juxtaposed at an upper part and a lower part of the flat cable 33 in the width direction in FIG. 8, but are not juxtaposed at a center part thereof.

The protruding part 334 is formed at the first extension portion 331 of the flat cable 33, and the protruding part 335 is formed in an area of the second extension portion 333 of the flat cable 33, which is separated from the curved portion 332 by a prescribed length or more. In other words, in the curved portion 332 and an area of the second extension portion 333, which is separated from the curved portion 332 by a prescribed length or less, no protruding part is formed and no reinforcement process for increasing a Young's modulus is performed.

Since the protruding part 335 is not formed in an entire area of the second extension portion 333 and is formed only in the area of the second extension portion 333, which is separated from the curved portion 332 by the prescribed length or more, when the scanner 40 is moved closest to the side (the plus X direction of the drawing) provided with the casing fixing part 34, that is, even when the slide member 50 is moved to an end portion of the slide path 70, which faces the side (the plus X direction of the drawing) provided with the casing fixing part 34, the protruding part 335 does not contact with the insertion part 54. In this way, it is possible to prevent the slide movement of the slide member 50 from being obstructed due to contact of the protruding part 335 formed at the flat cable 33 to the insertion part 54 of the slide member 50.

Figure 9:
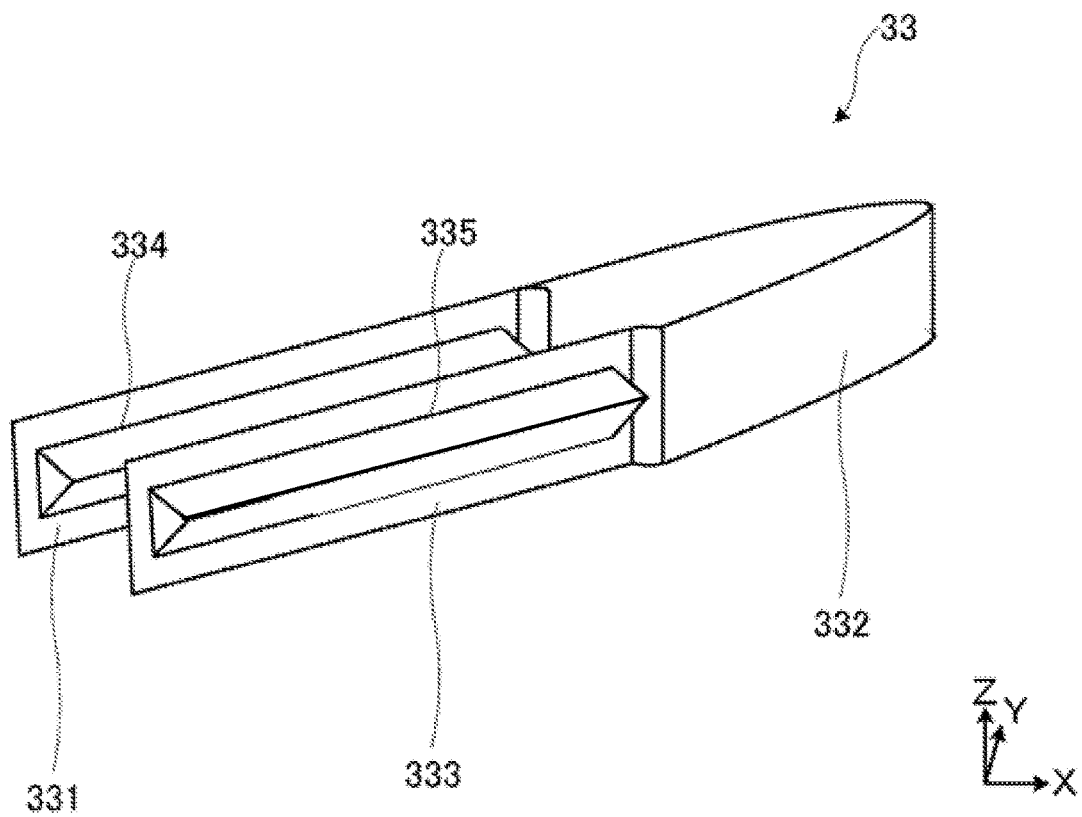
FIG. 9 is a diagram illustrating a modification example of a configuration of a flat cable.

FIG. 9 is a diagram illustrating a configuration of another modification example of the flat cable 33. As illustrated in the drawing, the protruding part 334 and the protruding part 335 may be provided such that their protruding directions from the flat cable 33 become equal to each other in a state in which the curved portion 332 is bent and the flat cable 33 is folded. The protruding part 335 may be formed to be larger than the protruding part 334. In this way, in the state in which the curved portion 332 is bent and the flat cable 33 is folded, the protruding part 334 is positioned in a concave portion formed at an opposite side of the protruding part 335, so that the protruding part 334 and the protruding part 335 overlap each other. In this way, the flat cable 33 can be received in a narrower area.

Figure 10:
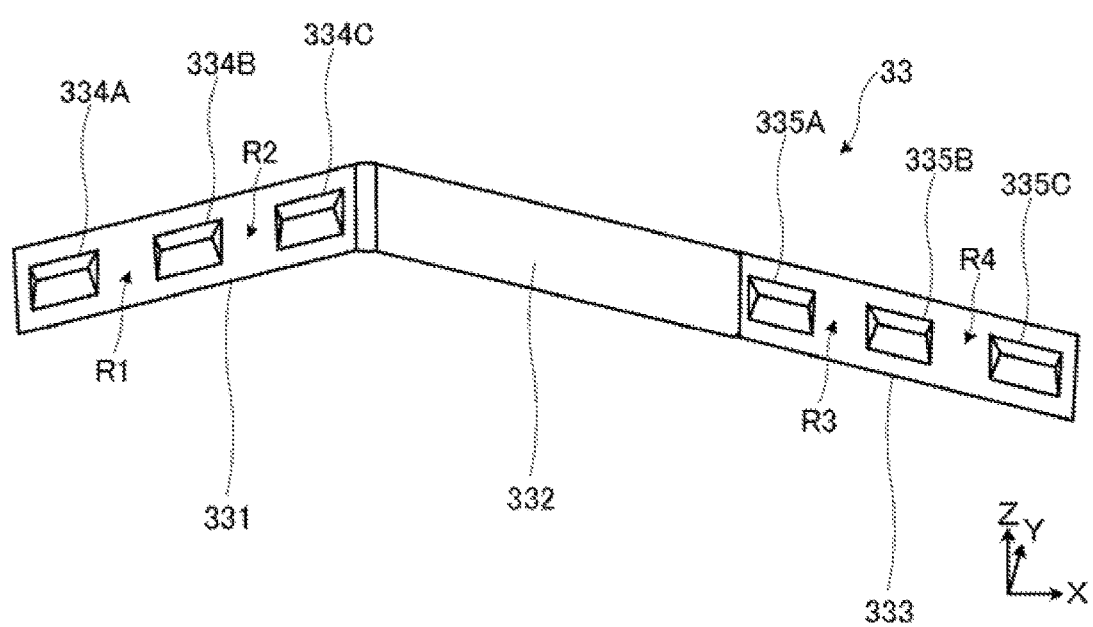
FIG. 10 is a diagram illustrating a modification example of a configuration of a flat cable.

FIG. 10 is a diagram illustrating a configuration of another modification example of the flat cable 33. As illustrated in the drawing, a plurality of protruding parts 334A to 334C and 335A to 335C formed by allowing a part of the flat surface to protrude in a direction perpendicular to the flat surface may be juxtaposed in a longitudinal direction of the flat cable 33.

In this way, no reinforcement process for increasing a Young's modulus is performed for an area R1 between the protruding part 334A and the protruding part 334B, an area R2 between the protruding part 334B and the protruding part 334C, an area R3 between the protruding part 335A and the protruding part 335B, and an area R4 between the protruding part 334B and the protruding part 334C. Therefore, since bending is possible even in the areas R1 to R4, the flat cable 33 can be deformed with more free appearance.

Furthermore, a plurality of core wires included in the flat cable 33 are juxtaposed in the width direction (the Z direction of the drawing) of the flat surface while avoiding the aforementioned protruding parts 334A to 334C and 335A to 335C. That is, the core wires are juxtaposed in the aforementioned areas R1 to R4 in addition to an upper part and a lower part of the flat cable 33 in the width direction in FIG. 10.

Modification Example 2

Figure 11A:
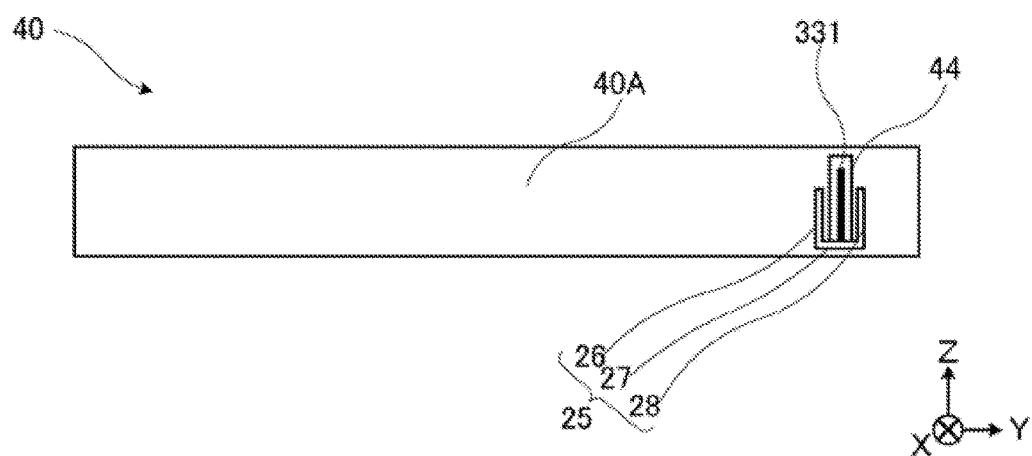
FIG. 11A is a diagram when a scanner illustrated in FIG. 3
Figure 11B:
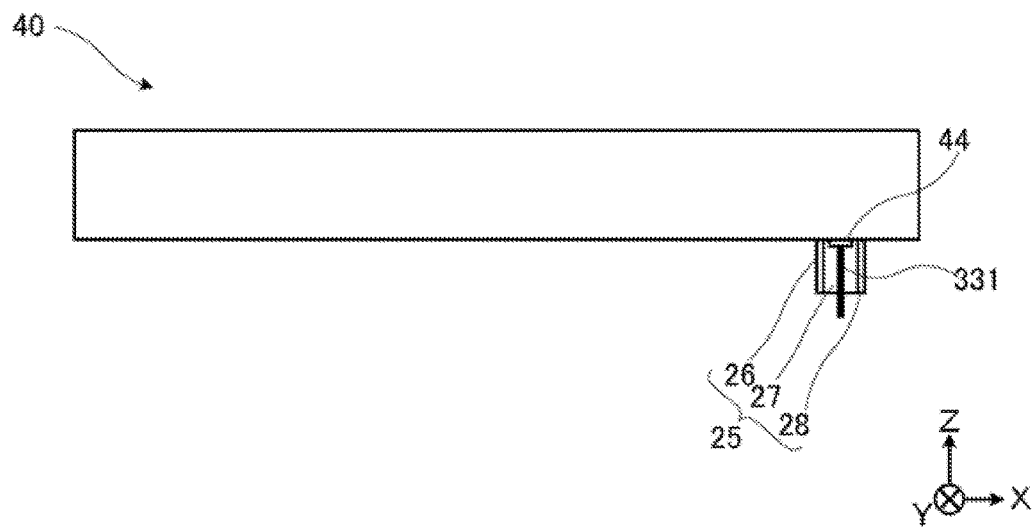
FIG. 11B is a diagram when a scanner illustrated in FIG. 3

FIG. 11A is a diagram when the scanner 40 illustrated in FIG. 3 and FIG. 6 is viewed from the side surface 40A side provided with the cable port 44, and FIG. 11B is a diagram when the scanner 40 illustrated in FIG. 3 and FIG. 6 is viewed from above. As illustrated in the drawings, the side surface 40A of the scanner 40 with the cable port 44 is provided with a holding member 25 that protrudes toward the sub-scanning direction from a lower position (the minus Z direction of the drawing) of the cable port 44. The holding member 25 includes a bottom wall portion 27, a first wall portion 26, and a second wall portion 28, wherein the first wall portion 26 and the second wall portion 28 protrude upward (the plus Z direction of the drawing) from both end portions of the bottom wall portion 27 in the main scanning direction. The first wall portion 26 and the second wall portion 28 are juxtaposed with each other at an interval corresponding to a length equal to or more than the thickness of the flat cable 33, and the first extension portion 331 of the flat cable 33 connected to the cable port 44 is inserted between the first wall portion 26 and the second wall portion 28. In this case, a side surface of the lower surface 31B side (the minus Z direction side of the drawing) of the casing 31 of the first extension portion 331 abuts the bottom wall portion 27 of the holding member 25. As described above, the first extension portion 331 is held from the lower surface 31B side of the casing 31 by the aforementioned first wall portion 26, second wall portion 28, and bottom wall portion 27. In this way, it is possible to prevent the flat cable 33 from contacting with the lower surface 31B of the casing 31 due to bending of the flat surface from the direction perpendicular to the lower surface of the placing plate 32.

Modification Example 3

Figure 12:
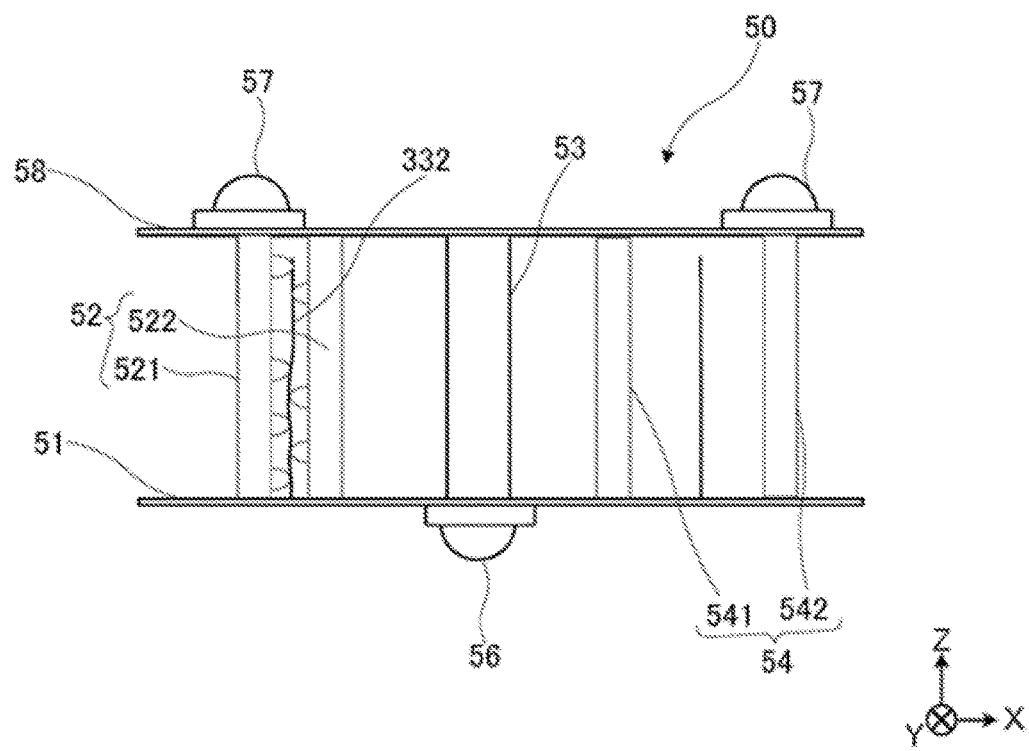
FIG. 12 is a diagram illustrating a configuration of a slide member of an image reading device according to a modification example 3.

FIG. 12 is a diagram illustrating a configuration of the slide member 50 according to a modification example 3. In the slide member 50 according to the modification example 3, an upper wall part 58 is provided above (the plus Z direction of the drawing) the base part 51, and each member of the locking part 52, the hooking part 53, and the insertion part 54 is provided between the base part 51 and the upper wall part 58. On a surface of the upper wall part 58, which faces the lower surface of the placing plate 32, a plurality of hemispherical abutting members 57 are formed to protrude to the lower surface side of the placing plate 32. The slide member 50 is slidably moved in the casing 31 in a state in which the plurality of abutting members 57 abut the lower surface of the placing plate 32 and the fitting part 56 is fitted into the groove of the slide path 70. The abutting members 57 abutting the lower surface of the placing plate 32 are provided, so that it is possible to slidably move the slide member 50 with a more stable posture.

Modification Example 4

Figure 13A:
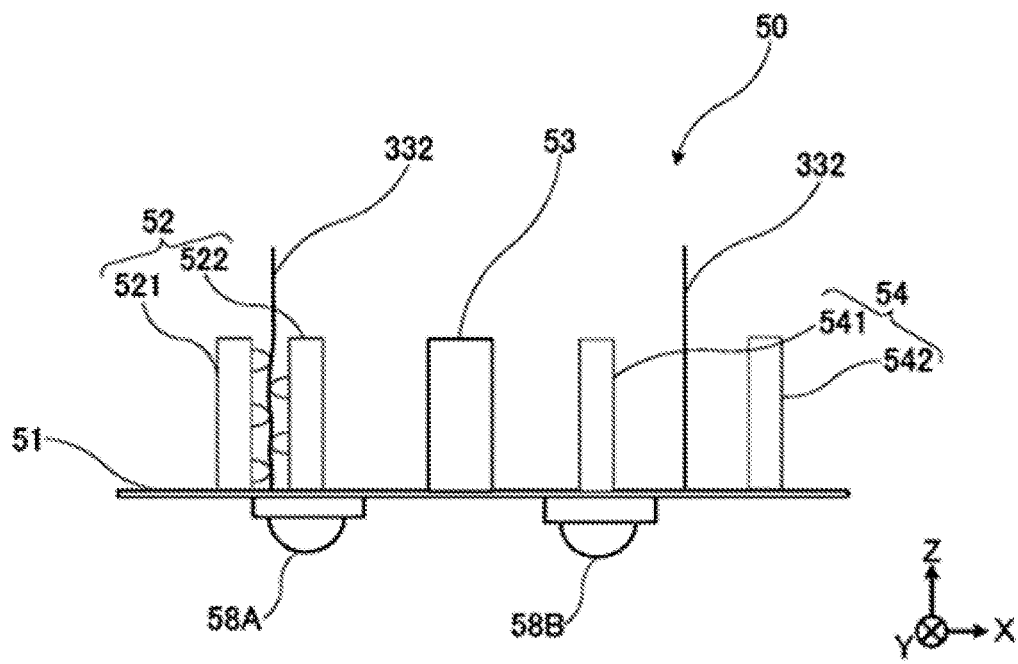
FIG. 13A is a diagram illustrating a configuration of a slide member of an image reading device according to a modification example 4.
Figure 13B:
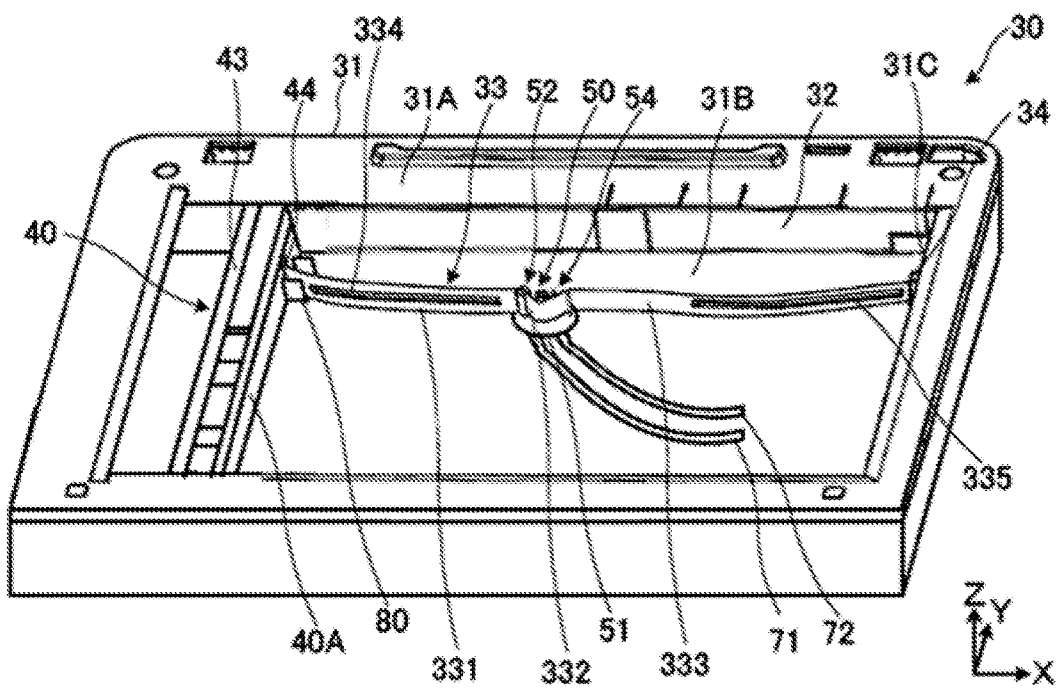
FIG. 13B is a diagram illustrating a configuration of a reading unit of an image reading device according to a modification example 4.

FIG. 13A is a diagram illustrating a configuration of the slide member 50 according to a modification example 4. As illustrated in the drawing, in the slide member 50 according to the modification example 4, on a surface of the base part 51, which faces the lower surface 31B of the casing 31, two fitting parts 58A and 58B are formed to protrude toward the lower surface 31B side (the minus Z direction of the drawing) of the casing 31. FIG. 13B is a diagram illustrating a configuration of the reading unit 30 according to the modification example 4. In the reading unit 30 according to the modification example 4, two slide paths 71 and 72 juxtaposed with each other are formed on the lower surface 31B of the casing 31. The slide paths 71 and 72 are formed to draw an arc toward the minus Y direction of the drawing and the minus X direction of the drawing. The fitting part 58A of the slide member 50 is fitted to the slide path 71, and the fitting part 58B of the slide member 50 is fitted to the slide path 72.

By force transmitted to the locking part 52 from the curved portion 332 of the flat cable 33 according to the reciprocating movement of the scanner 40, a direction of the slide member 50 along the lower surface 31B is changed; however, the slide member 50 is allowed to slidably move along the two slide paths 71 and 72 as described above, so that the direction of the slide member 50 can be restricted in a constant range. For example, it is possible to prevent the slide member 50 from rotating once or more by the force transmitted from the flat cable 33 and thus the flat cable 33 from becoming tangled. Furthermore, it is possible to slidably move the slide member 50 with a more stable posture.

Modification Example 5

Figure 14A:
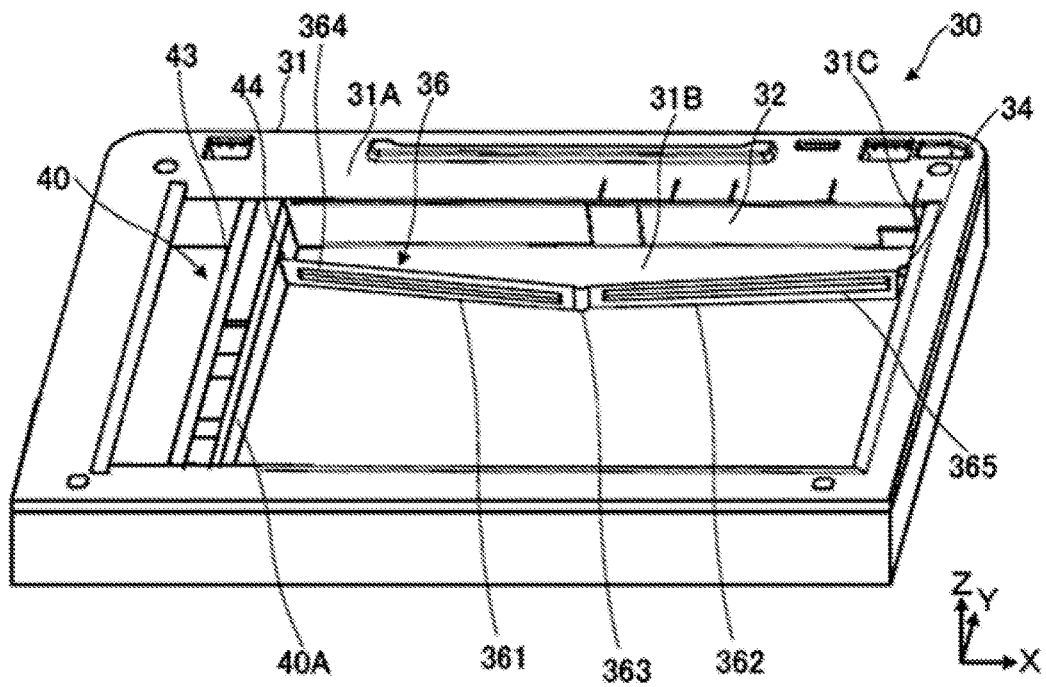
FIG. 14A is a diagram illustrating a configuration of a reading unit of an image reading device according to a modification example 5.

FIG. 14A is a diagram illustrating a configuration of the reading unit 30 according to a modification example 5. As illustrated in the drawing, the reading unit 30 according to the modification example 5 is different from the aforementioned embodiment 1 in terms of a shape of the flat cable. In the reading unit 30 according to the modification example 5, a flat cable 36 includes a first extension portion 361 extending from one end connected to the cable port 44, a second extension portion 362 extending from the other end fixed by the casing fixing part 34, and a curved portion 363 connecting the first extension portion 361 to the second extension portion 362. A protruding part 364 is formed at the first extension portion 361 of the flat cable 36, and a protruding part 365 is formed at the second extension portion 362. On the other hand, no protruding part is formed at the curved portion 363 and no reinforcement process for increasing a Young's modulus is performed.

Figure 14B:
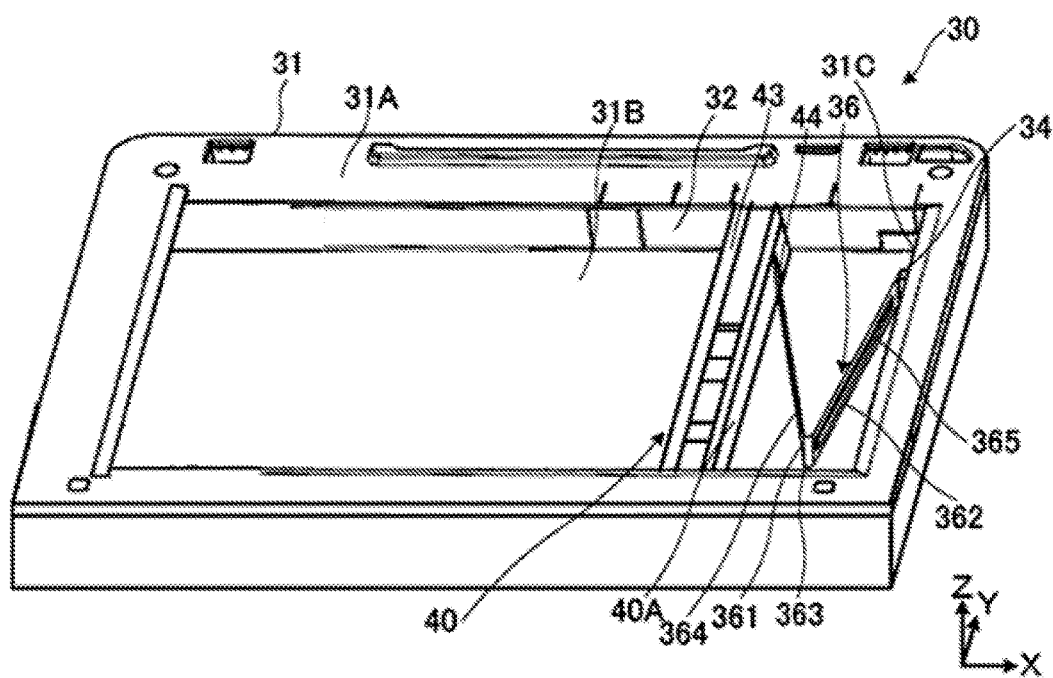
FIG. 14B is a diagram illustrating a state in which a scanner is moved from a state illustrated in FIG. 14A.

As illustrated in FIG. 14A, since an area of the curved portion 363 subjected to no reinforcement process and can be bent is narrow as compared with the case of the aforementioned embodiment 1, the flat cable 36 is deformed in an approximate V shape as illustrated in FIG. 14B when the scanner 40 is moved in the plus X direction of the drawing. Therefore, the flat cable 36 draws a large arc and swells to be bent in the minus Y direction of the drawing, so that it is possible to prevent a part of the flat cable 36 from contacting with a side surface of the casing 31.

In the above, the reinforcement process for increasing a Young's modulus by forming the protruding parts 364 and 365 is performed; however, the technical range of the present disclosure is not always limited thereto. For example, the Young's modulus may be improved by forming a sheet member (a reinforcing member) having constant elasticity at the first extension portion 361 and the second extension portion 362 of the flat cable 36.

Modification Example 6

Figure 15:
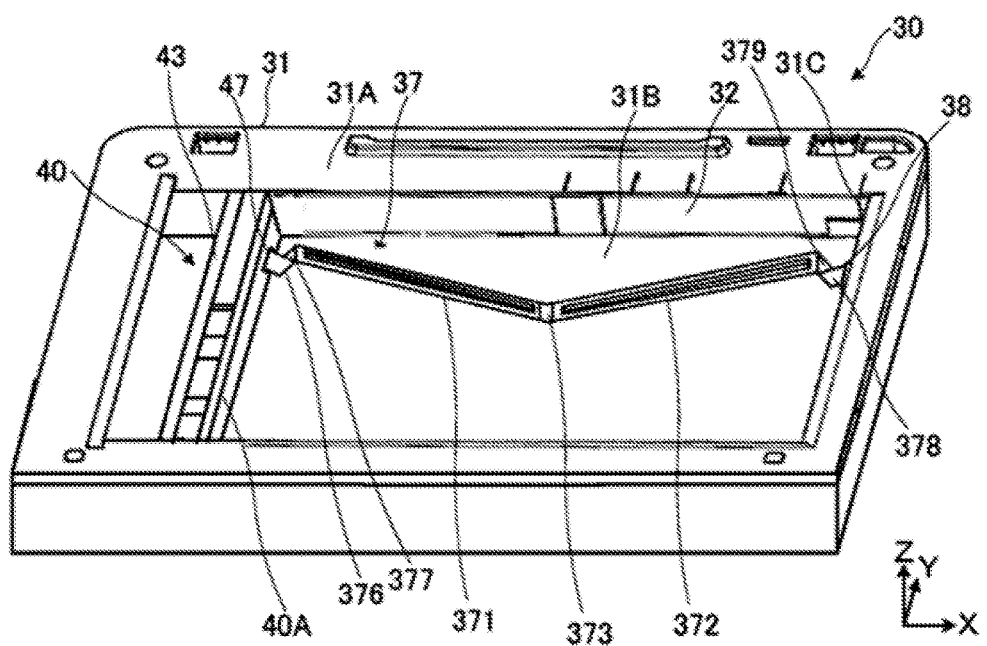
FIG. 15 is a diagram illustrating a configuration of a reading unit of an image reading device according to a modification example 6.

FIG. 15 is a diagram illustrating a configuration of the reading unit 30 according to a modification example 6. As illustrated in the drawing, in the reading unit 30 according to the modification example 6, a cable port 47 extending in the main scanning direction is formed at the side surface 40A of the scanner 40. Among the side surfaces of the casing 31, on the side surface 31C positioned at an opposite end portion (the plus X direction of the drawing) of the home position of the scanner 40 in the sub-scanning direction, a casing fixing part 38 (a frame fixing part) is provided to fix the other end of a flat cable 37 to the casing 31 such that the width direction of the flat surface is along the main scanning direction.

By the aforementioned cable port 47 and casing fixing part 38, the width direction of the flat surface is along the main scanning direction at one end and the other end of the flat cable 37. On the other hand, at the center part of the flat cable 37, the width direction of the flat surface is preferably along the direction perpendicular to the lower surface of the placing plate 32 in order to avoid the flat cable 37 from contacting with the placing plate 32. Therefore, in the reading unit 30 according to the modification example 6, the flat cable 37 has a shape illustrated in FIG. 16C. That is, in the flat cable 37, an end portion 376 including one end connected to the cable port 47 is provided with a first bending portion 377 bent such that the width direction of the flat surface is directed from the direction along the main scanning direction to the direction perpendicular to the lower surface of the placing plate 32. Furthermore, in the flat cable 37, an end portion 378 including the other end fixed by the casing fixing part 38 is provided with a second bending portion 379 bent such that the width direction of the flat surface is directed from the direction along the main scanning direction to the direction perpendicular to the lower surface of the placing plate 32.

Figure 16A:
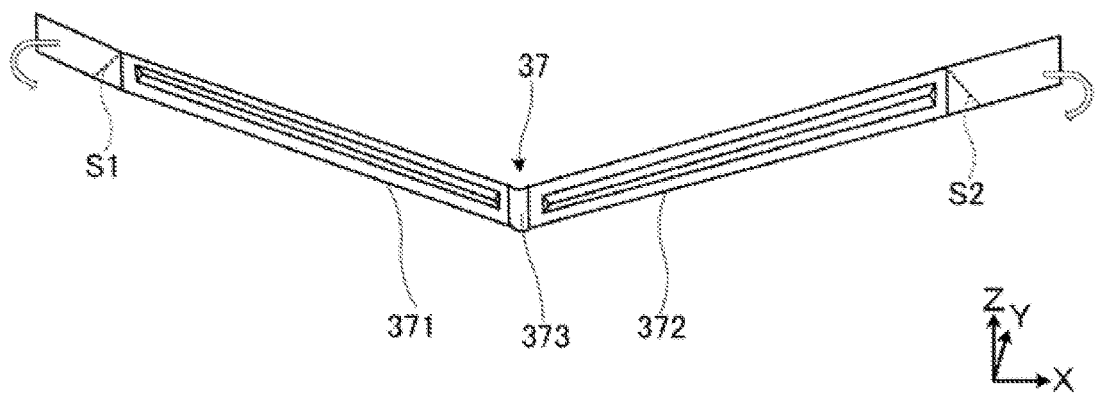
FIG. 16A to FIG. 16C are diagrams illustrating a configuration of a flat cable of an image reading device according to a modification example 6.
Figure 16B:
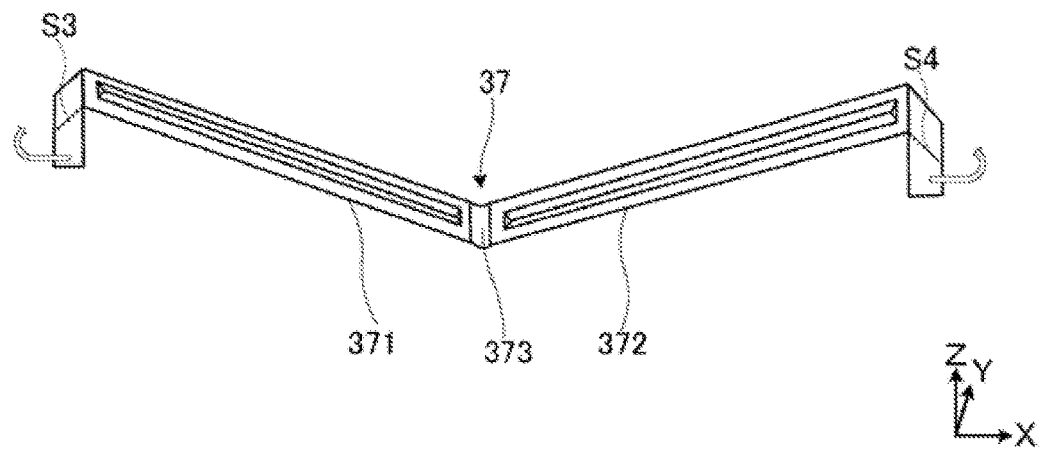
Figure 16C:
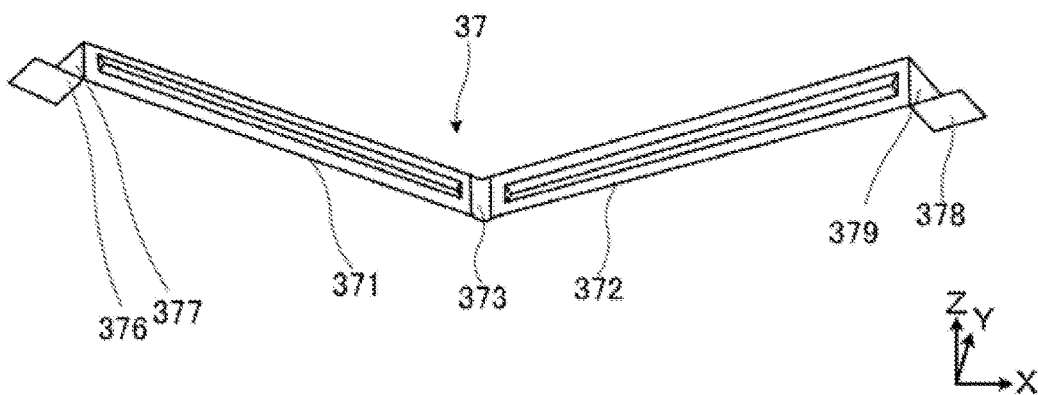

The first bending portion 377 is formed by bending an end portion of a first extension portion 371 in an arrow direction along a dotted line S1 illustrated in FIG. 16A and then bending the end portion to an arrow direction along a dotted line S3 illustrated in FIG. 16B. Furthermore, the second bending portion 379 is formed by bending an end portion of a second extension portion 372 in an arrow direction along a dotted line S2 illustrated in FIG. 16A and then bending the end portion in an arrow direction along a dotted line S4 illustrated in FIG. 16B, wherein the second extension portion 372 is connected to the first extension portion 371 via a curved portion 373.

As described above, in accordance with the reading unit 30 according to the modification example 6, in a configuration of a cable port and a casing fixing part employed in a general image reading device and extending in the main scanning direction, it is possible to avoid the flat cable 37 from contacting with the placing plate 32.

Modification Example 7

Figure 17:
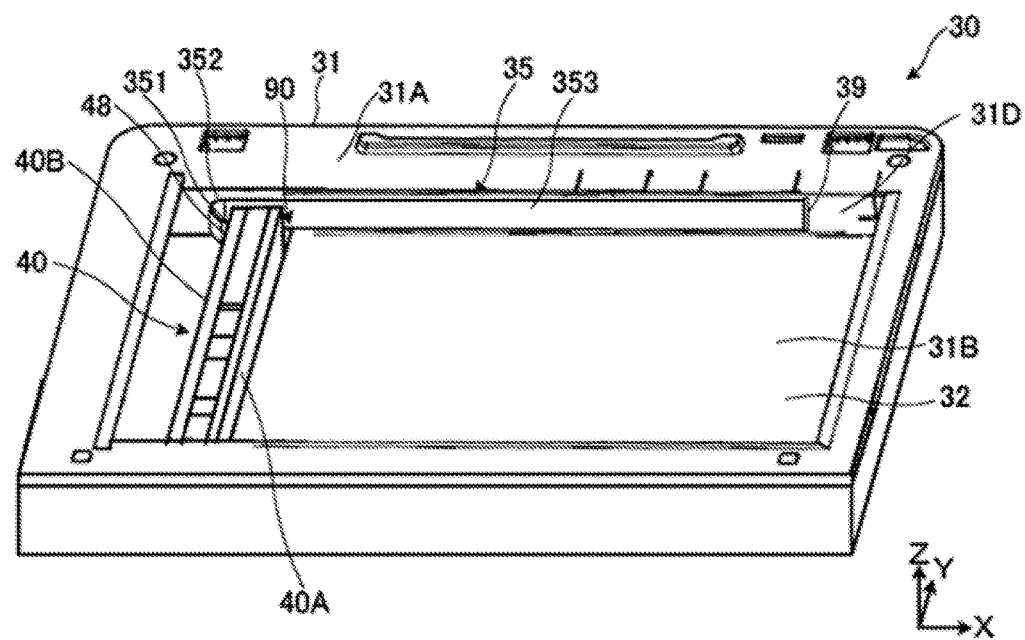
FIG. 17 is a diagram illustrating a configuration of a reading unit of an image reading device according to a modification example 7.

FIG. 17 is a diagram illustrating a configuration of the reading unit 30 according to a modification example 7. As illustrated in the drawing, in the reading unit 30 according to the modification example 7, at an end portion of one side (the plus Y direction of the drawing) of the main scanning direction in a side surface 40B of the scanner 40 at the minus X direction side of the drawing, a cable port 48 is formed to extend in the direction perpendicular to the lower surface of the placing plate 32, wherein one end of a flat cable 35 is connected to the cable port 48. Furthermore, a side surface 31D of the casing 31 is provided with a casing fixing part 39, and the other end of the flat cable 35 is fixed to the casing 31 by the casing fixing part 39. By the aforementioned cable port 48 and casing fixing part 39, the flat cable 35 extends in the casing 31 such that the width direction of its flat surface is along the direction perpendicular to the lower surface of the placing plate 32. Specifically, the flat cable 35 includes a first extension portion 351 extending from one end of the flat cable 35 to one side (the minus X direction side of the drawing) in the sub-scanning direction, a curved portion 352 continuous to the first extension portion 351 and folded from the one side in the sub-scanning direction to the other side (the plus X direction of the drawing) of an opposite side, and a second extension portion 353 continuous to the curved portion 352 and extending to the other side in the sub-scanning direction, wherein the other end of the second extension portion 353 is fixed to the casing fixing part 39.

Figure 18:
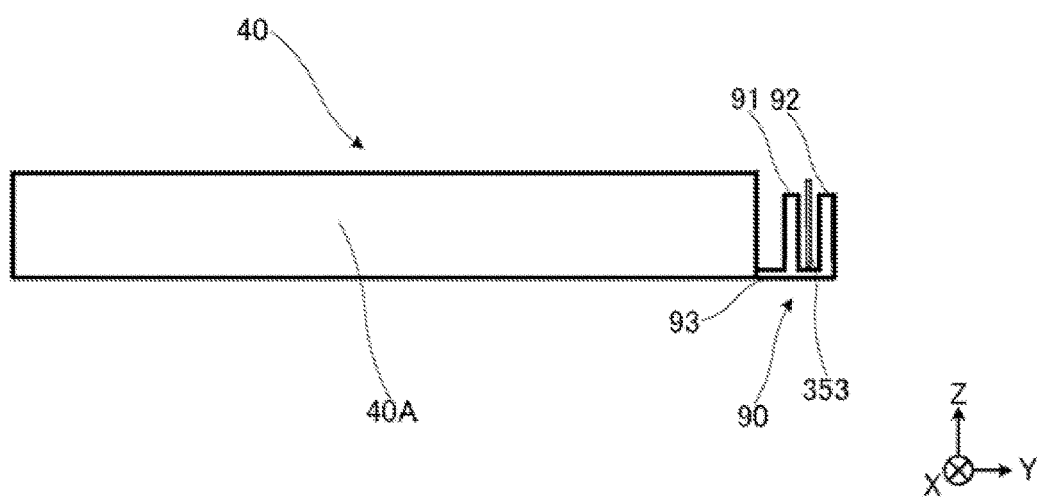
FIG. 18 is a diagram when a scanner of an image reading device according to a modification example 7 is viewed from a side.

One side of the scanner 40 in the main scanning direction (the plus Y direction of the drawing) is provided with a holding member 90 that holds a part of the second extension portion 353 of the flat cable 35 from the lower surface 31B side of the casing 31. The holding member 90 is fixed to a side surface of the scanner 40 and is reciprocally moved in the casing 31 together with the scanner 40. FIG. 18 is a side view when the scanner 40 is viewed from the plus X direction side. As illustrated in the drawing, the holding member 90 includes a bottom wall portion 93, a first wall portion 91, and a second wall portion 92, wherein the first wall portion 91 and the second wall portion 92 protrude to the lower surface side of the placing plate 32 from the bottom wall portion 93. The first wall portion 91 and the second wall portion 92 are juxtaposed with each other at an interval corresponding to a length equal to or more than the thickness of the flat cable 35, and the second extension portion 353 of the flat cable 35 is inserted between the first wall portion 91 and the second wall portion 92. In this case, a side surface of the second extension portion 353, which faces the lower surface 31B side (the minus Z direction side of the drawing) of the casing 31, abuts the bottom wall portion 93 of the holding member 90. As described above, the second extension portion 353 is held from the lower surface 31B side of the casing 31 by the aforementioned first wall portion 91, second wall portion 92, and bottom wall portion 93. In this way, it is possible to prevent the flat cable 35 from contacting with the lower surface 31B of the casing 31 due to bending of the flat surface from the direction perpendicular to the lower surface of the placing plate 32.

Figure 19A:
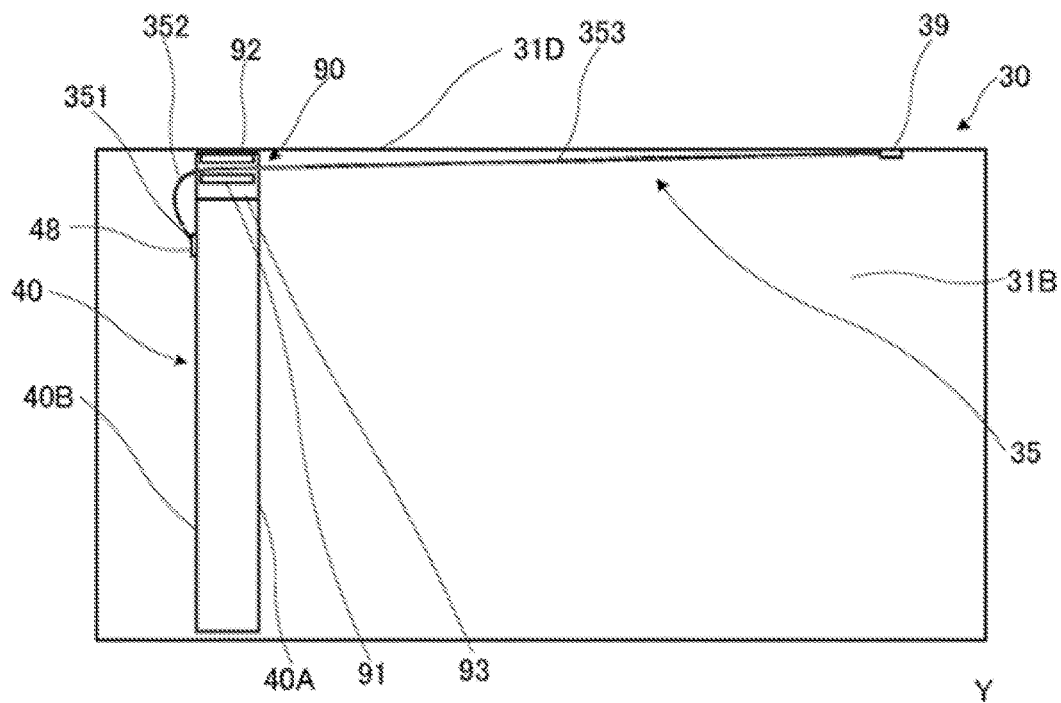
FIG. 19A and FIG. 19B are diagrams when a scanner of an image reading device according to a modification example 7 is viewed from above.
Figure 19B:
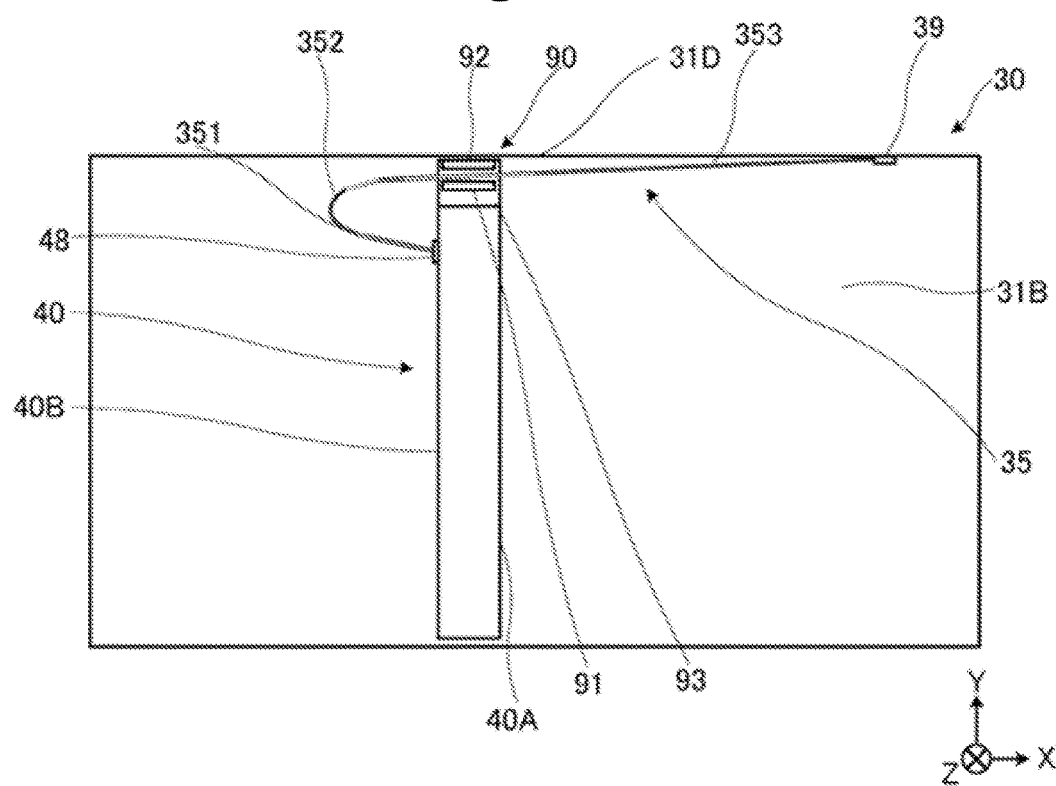

Furthermore, the holding member 90 also guides the deformation of the flat cable 35. FIG. 19A illustrates the reading unit 30 when the scanner 40 is positioned at the home position. When the scanner 40 is moved from this state to the plus X direction of the drawing, the flat cable 35 is deformed as illustrated in FIG. 19B. Since the second extension portion 353 is inserted between the first wall portion 91 and the second wall portion 92 of the holding member 90, the flat cable 35 has a difficulty in contacting with the side surface 31D of the casing 31. When the holding member 90 is not provided, since the flat cable 35 is deformed in a state in which the flat cable 35 contacts with the side surface 31D of the casing 31, frictional force is generated between the side surface 31D of the casing 31 and the flat cable 35, and the reciprocating movement of the scanner 40 may be obstructed by the frictional force. In this regard, in accordance with the reading unit 30 according to the modification example 7, the flat cable 35 has a difficulty in contacting with the side surface 31D of the casing 31 and no frictional force is generated between the side surface 31D of the casing 31 and the flat cable 35, so that the reciprocating movement of the scanner 40 is not obstructed.

Furthermore, the holding member 90 is fixed to the side surface of the scanner 40 and is reciprocally moved in the casing 31 together with the scanner 40 as described above, but its reciprocating movement range is a range of a lower side (the minus Z direction of the drawing) of the placing plate 32 in the casing 31. In other words, the holding member 90 is provided not to be positioned below the upper surface 31A in the casing 31. In this way, the holding member 90 can be visible through the placing plate 32 without being blocked by the upper surface 31A of the casing 31 from above (the plus Z direction of the drawing).

When the flat cable 35 is detached from the holding member 90, maintenance is required. In this regard, the holding member 90 is provided at a position visible from above as described above, so that a user easily find detachment of the flat cable 35 from the holding member 90, and the like.

Embodiment 2

Figure 20:
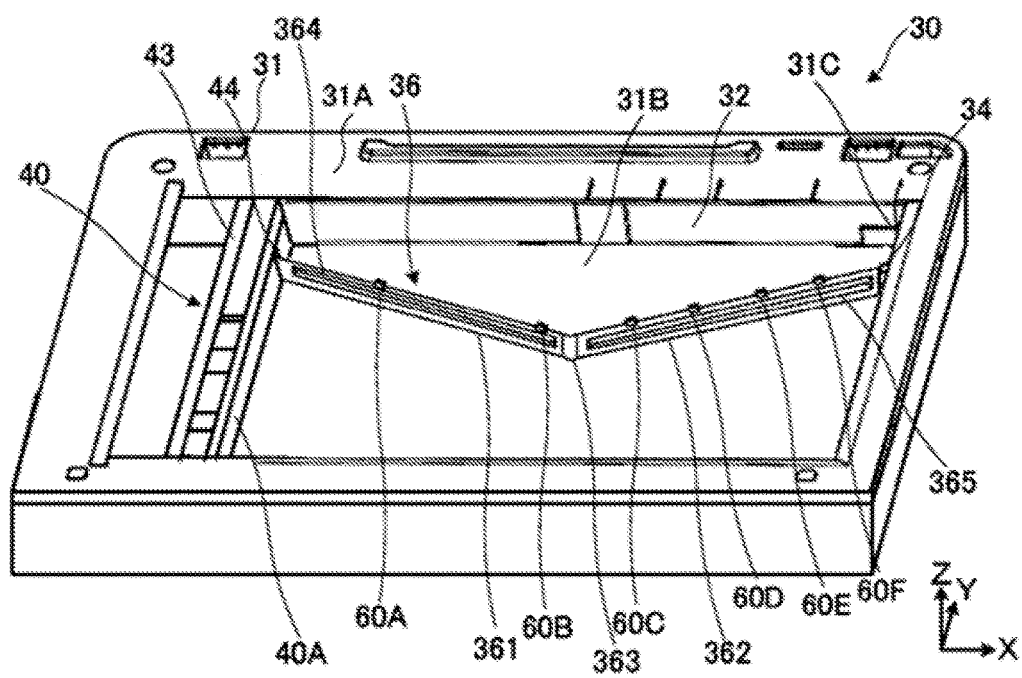
FIG. 20 is a diagram illustrating a configuration of a reading unit of an image reading device according to an embodiment 2.
Figure 21:
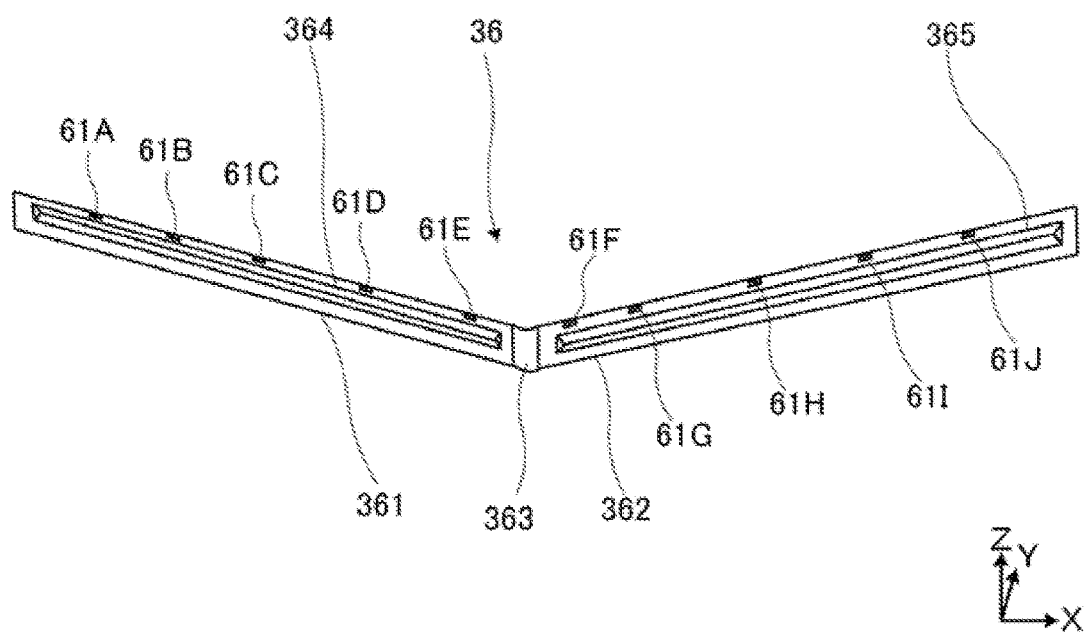
FIG. 21 is a diagram illustrating a configuration of a flat cable of an image reading device according to an embodiment 2.
Figure 22:
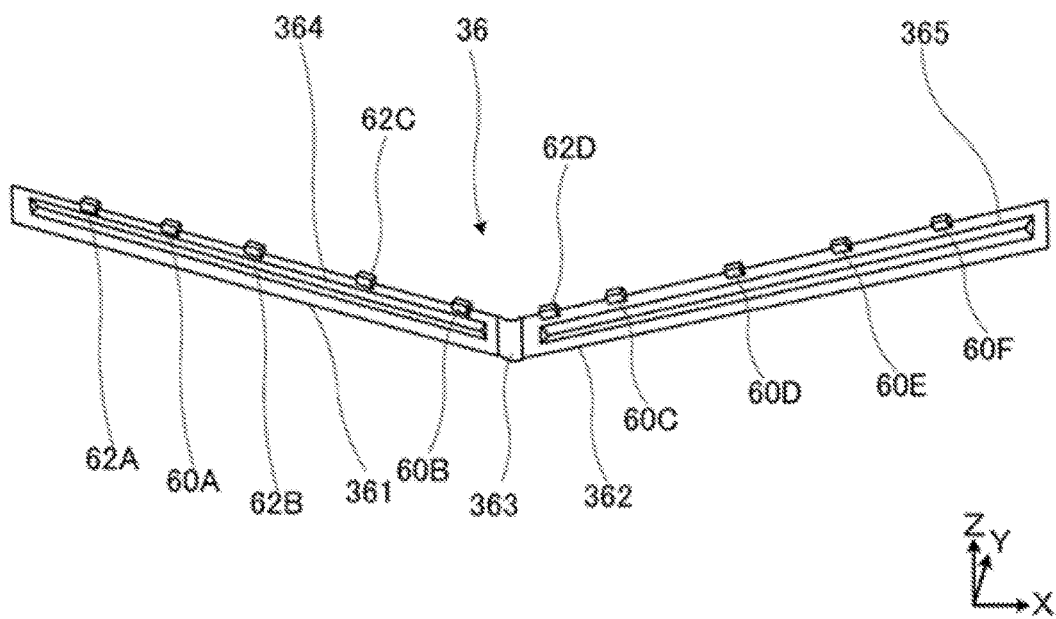
FIG. 22 is a diagram illustrating a configuration of a flat cable of an image reading device according to an embodiment 2.

FIG. 20 is a diagram illustrating a configuration of the reading unit 30 according to an embodiment 2. FIG. 21 and FIG. 22 are diagrams illustrating a configuration of a flat cable 36 according to the embodiment 2.

As illustrated in FIG. 21, in the reading unit 30 according to the embodiment 2, at a side of a flat cable 36, which faces the lower surface of the placing plate 32, a plurality of notched parts 61A to 61J obtained by notching a part of a film of the flat cable 36 are formed. By the notched parts 61A to 61J, some of a plurality of core wires included in the flat cable 36 are exposed. As illustrated in FIG. 22, some of the notched parts 61A to 61J are provided with a plurality of document detection sensors 60A to 60F in a state in which a detection direction is directed to the lower surface side of the placing plate 32. Specifically, among the notched parts 61A to 61J, the notched parts 61B, 61E, 61G, 61H, 61I, and to 61J are provided with the document detection sensors 60A to 60F. On the other hand, the notched parts 61A, 61C, 61D, and 61F not provided with the document detection sensors 60A to 60F are respectively provided with protection covers 62A to 62D. The protection covers 62A to 62D are made of resin having insulation properties, and the like, and protect the core wires exposed from the notched parts.

Sizes, by which documents can be detected, differ according to the positions of the document detection sensors 60A to 60F, which will be described in detail later. Furthermore, sizes of documents to be detected differ according to the type of an image reading device. Therefore, when the image reading device 10 is manufactured, it is necessary to change the arrangement positions of the document detection sensors 60A to 60F according to the sizes of documents to be detected. In this regard, according to the aforementioned configuration, among the notched parts 61A to 61J formed in the flat cable 36, the document detection sensor 60 can be provided to a notched part positioned at a desired position, and the protection cover 62 can be provided to a notched part positioned at another position. In this way, even though the flat cable 36 different for each type of an image reading device is not provided, the document detection sensor 60 is provided at a desired position, so that it is possible to detect a size of a document with a desired size. In addition, since the document detection sensors 60A to 60F have the same configuration, when they are not discriminately described below, they will be described as the document detection sensor 60 by omitting "A", "F" and the like.

The document detection sensor 60 is so-called a reflection type sensor and has a light emitting element and a light receiving element. The light emitting element, for example, is an infrared emitting diode that emits infrared light, is arranged such that its main emission direction is directed to the placing plate 32, and emits the infrared light toward a document placed on the placing plate 32. Furthermore, the light receiving element is a light receiving element such as a photodiode and a phototransistor, is arranged such that its main light receiving direction is directed to the placing plate 32, and receives the infrared light reflected from the placing plate 32 or the document placed on the placing plate 32.

The document detection sensor 60 is electrically connected to any of a plurality of core wires included in the flat cable 36 in the notched parts 61A to 61J. A detection signal outputted from the document detection sensor 60 is transmitted to the control unit 100 via the core wires included in the flat cable 36. The detection signal outputted from the document detection sensor 60 is a signal indicating strength of the infrared light received in the light receiving element. When the strength of the infrared light indicated by the detection signal is equal to or more than prescribed strength, the document size detection section 102 of the control unit 100 detects that a document exists above the document detection sensor 60 and the infrared light emitted by the light emitting element has been reflected from the document. Then, on the basis of detection signals outputted from the plurality of document detection sensors 60, the document size detection section 102 detects whether a document exists above each document detection sensor 60 and decides a size of the document placed on the placing plate 32.

Figure 23:
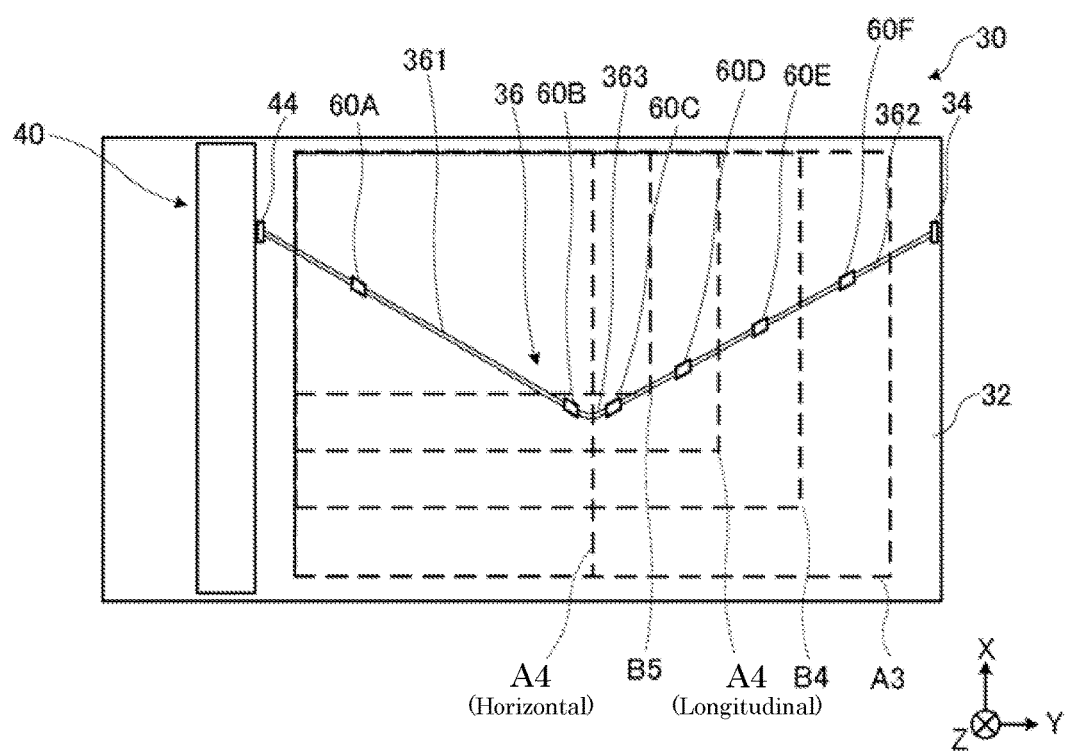
FIG. 23 is a diagram when a reading unit with a scanner being positioned at a home position, is viewed from above in an image reading device according to an embodiment 2.

The document detection sensors 60A to 60F are respectively provided to the flat cable 36 so as to be positioned below prescribed positions of the placing plate 32. FIG. 23 is a diagram when the reading unit 30 with the scanner 40 being positioned at the home position, is viewed from above. In the drawing, dotted lines indicate sizes of documents placed on the placing plate 32. When the scanner 40 is positioned at the home position, the document size detection section 102 decides sizes of documents placed on the placing plate 32 on the basis of detection signals outputted from the plurality of document detection sensors 60.

Figure 24:
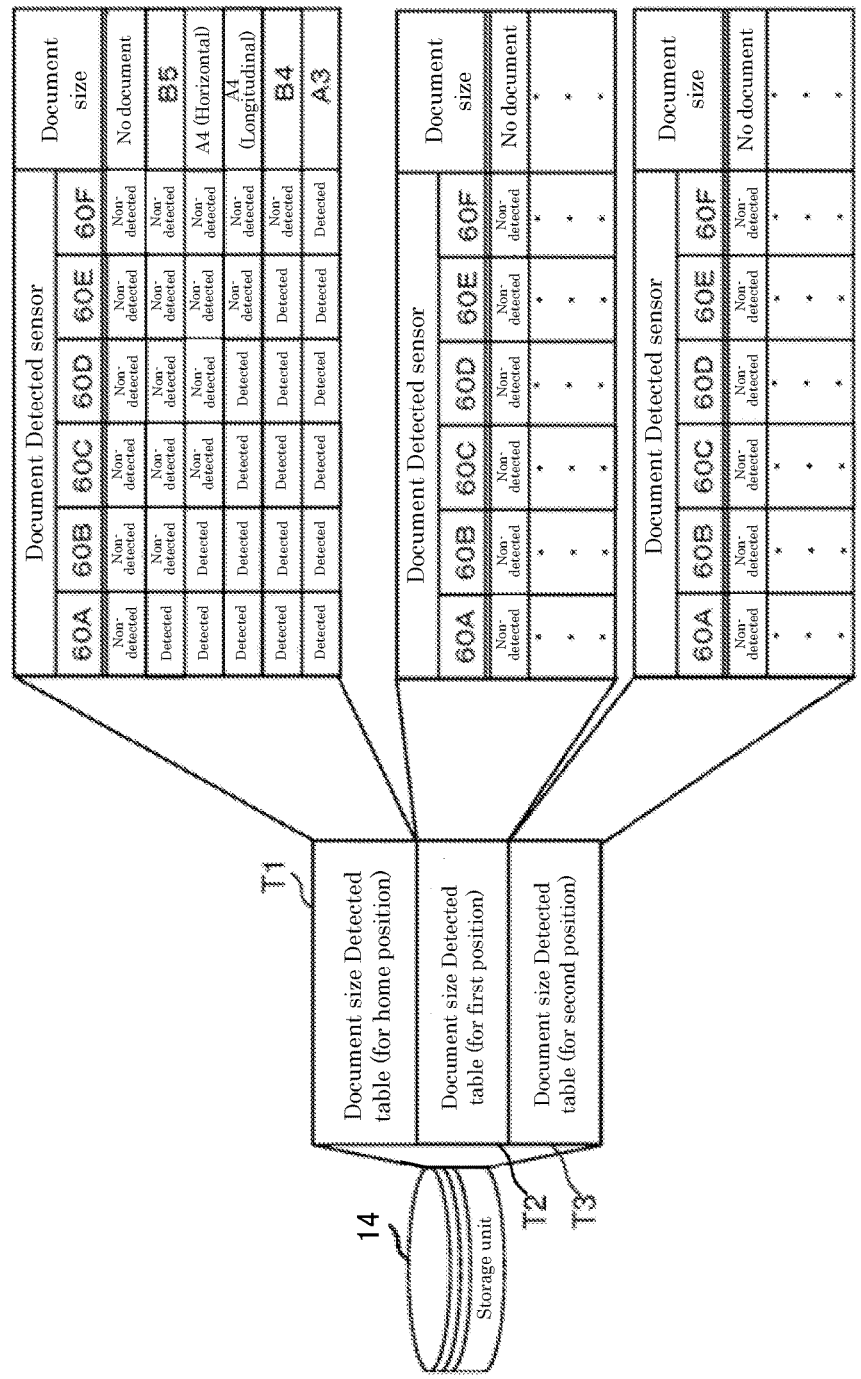
FIG. 24 is a diagram illustrating an example of data stored in a storage unit of an image reading device according to an embodiment 2.

As illustrated in FIG. 24, the storage unit 14 stores a document size detection table. A document size detection table T1 indicates a relation between detection signal output of the document detection sensors 60A to 60F and document sizes when the scanner 40 is positioned at the home position. The document size detection section 102 decides a size of a document placed on the placing plate 32 according to the document size detection table T1. For example, when all the document detection sensors 60A to 60F output detection signals indicating that a document exists above, the document size detection section 102 detects that a document with a size A3 is placed on the placing plate 32. For example, when the document detection sensors 60A to 60D output detection signals indicating that a document exists above and the document detection sensors 60E and 60F output detection signals indicating that there is no document, the document size detection section 102 detects that a document with a (longitudinal) size A4 is placed on the placing plate 32. As described above, on the basis of the detection signals outputted from the document detection sensors 60A to 60F, the document size detection section 102 can detect document sizes from sizes A3 to B5.

As described above, in accordance with the image reading device 10 according to the embodiment 2, the document detection sensor 60 is provided to the flat cable 36 and the detection signal can be transmitted from the document detection sensor 60 to the control unit 100 by using the flat cable 36, so that it is possible to simplify a wiring structure in the device. Furthermore, in the image reading device 10 according to the embodiment 2, the flat cable 36 is arranged such that the width direction of its flat surface is along the direction perpendicular to the lower surface of the placing plate 32, so that the document detection sensor 60 can be provided in a state in which the detection direction is directed to the lower surface side of the placing plate 32.

Modification Example

As illustrated in FIG. 24, the storage unit 14 stores a plurality of document size detection tables T1 to T3. The document size detection table T2 indicates a relation between the detection signal output of the document detection sensors 60A to 60F and document sizes when the scanner 40 is positioned at a first position separated from the home position by a prescribed distance. Furthermore, the document size detection table T3 indicates a relation between the detection signal output of the document detection sensors 60A to 60F and document sizes when the scanner 40 is positioned at a second position separated from the home position by a prescribed distance.

The document size detection section 102 first specifies document sizes on the basis of the detection signals outputted from the document detection sensors 60A to 60F when the scanner 40 is positioned at the home position. However, there is a case where it is not possible to specify the document sizes according to output values of the detection signals of the document detection sensors 60A to 60F. For example, when the document detection sensor 60A to the document detection sensor 60C output detection signals indicating that documents exists above and the document detection sensors 60D and 60E output detection signals indicating that no documents exist above, it is not possible to specify the document sizes in spite of referring to the document size detection table T1. In this case, the document size detection section 102 moves the scanner 40 to the prescribed first position from the home position. When the scanner 40 is moved to the prescribed first position from the home position, the positions of the document detection sensors 60A to 60F are also changed. On the basis of detection signals outputted from the document detection sensors 60A to 60F, the document size detection section 102 specifies document sizes with reference to the document size detection table T2. Since the positions of the document detection sensors 60A to 60F are changed from when the scanner is positioned at the home position, it is possible to specify documents with special sizes which are not able to be specified when the scanner 40 is positioned at the home position.

Furthermore, in a case where it is not possible to specify document sizes on the basis of the detection signals outputted from the document detection sensors 60A to 60F when the scanner 40 is positioned at the first position, the document size detection section 102 moves the scanner 40 to the second position by further moving the scanner 40. Then, on the basis of detection signals outputted from the document detection sensors 60A to 60F when the scanner 40 is positioned at the prescribed second position, the document size detection section 102 specify the document sizes with reference to the document size detection table T3.

As described above, in the image reading device 10 according to the modification example, in a case where it is not possible to specify document sizes on the basis of detection signals outputted from the document detection sensors 60A to 60F when the scanner 40 is positioned at the home position, the document size detection section 102 moves the scanner 40 to the prescribed positions from the home position. Then, on the basis of the detection signals outputted from the document detection sensors 60A to 60F when the scanner 40 is positioned at the prescribed positions in addition to the detection signals outputted from the document detection sensors 60A to 60F when the scanner 40 is positioned at the home position, the document size detection section 102 decides sizes of documents placed on the placing plate 32. In this way, it is possible to more specifically specify documents sizes.

<Supplement>

The configurations described in the aforementioned embodiments and the configurations described in the aforementioned modification examples may be combined with each other. For example, the configuration of the flat cable according to the modification example 6 illustrated in FIG. 16C may be employed in other embodiments and modification examples.

Furthermore, the control program described in the aforementioned embodiments and the aforementioned modification examples may be stored in a non-transitory computer readable storage medium, for example, a hard disk, a CD-ROM, a DVD-ROM, a semiconductor memory and the like.

What is claimed is:

1. An image reading device comprising:
   a placing plate on which a document to be read is placed;
   a box-shaped frame that supports the placing plate;
   a scanner that has a reading mechanism extending in a main scanning direction and is reciprocally moved in a sub-scanning direction at a side of a lower surface opposite to an upper surface of the placing plate, on which the document is placed, in the frame; and
   a flat cable that has a flat surface, has a first end connected to a cable port provided in the scanner and a second end connected to the frame, and transmits/receives a signal to/from the scanner, the first end facing the second end,
   wherein the flat cable extends in the frame such that a width direction of the flat surface is along a direction perpendicular to the lower surface of the placing plate,
   wherein the flat cable is subjected to a reinforcement process for increasing a Young's modulus for the width direction of the flat surface, and
   wherein the flat cable is provided with a protruding part formed by allowing a part of the flat surface to protrude in a direction perpendicular to the flat surface, and the reinforcement process is performed by the protruding part.

2. The image reading device of claim 1, wherein the flat cable includes a first extension portion extending from the first end, a second extension portion extending from the second end, and a curved portion connecting the first extension portion to the second extension portion,
   each of the first extension portion and the second extension portion is provided with at least one or more protruding part, and in a state in which the curved portion is curved and the flat cable is folded, the protruding part formed at the first extension portion and the protruding part formed at the second extension portion protrude in a same direction from the flat cable.

3. The image reading device of claim 2, wherein one of the protruding part formed at the first extension portion and the protruding part formed at the second extension portion is formed to be larger than a remaining one.

4. The image reading device of claim 1, wherein the protruding part is formed in plural in a longitudinal direction of the flat cable.

5. The image reading device of claim 1, wherein the flat cable includes a plurality of core wires, and
the plurality of core wires are juxtaposed in the width direction of the flat surface while avoiding the protruding part.

6. The image reading device of claim 1, wherein the cable port of the scanner extends in the direction perpendicular to the lower surface of the placing plate, and
at a side surface of the frame, which is perpendicular to the placing plate, a frame fixing part is provided to fix the second end of the flat cable such that the width direction of the flat surface is along the direction perpendicular to the lower surface of the placing plate.

7. The image reading device of claim 1, wherein the cable port of the scanner extends in the main scanning direction,
at the first end of the flat cable, the width direction of the flat surface is along the main scanning direction, and
an end portion of the flat cable including the first end is provided with a first bending portion bent such that the width direction of the flat surface is directed from a direction along the main scanning direction to the direction perpendicular to the lower surface of the placing plate.

8. The image reading device of claim 1, wherein a principal surface of the frame, which faces the placing plate, is provided with a frame fixing part that fixes the second end of the flat cable such that the width direction of the flat surface is along the main scanning direction, and
an end portion of the flat cable including the second end is provided with a second bending portion bent such that the width direction of the flat surface is directed from a direction along the main scanning direction to the direction perpendicular to the lower surface of the placing plate.

9. An image forming apparatus comprising:
the image reading device of claim 1; and
an image forming unit that forms an image read by the image reading device on a recording paper.

10. An image reading device comprising:
a placing plate on which a document to be read is placed;
a box-shaped frame that supports the placing plate;
a scanner that has a reading mechanism extending in a main scanning direction and is reciprocally moved in a sub-scanning direction at a side of a lower surface opposite to an upper surface of the placing plate, on which the document is placed, in the frame; and
a flat cable that has a flat surface, has a first end connected to a cable port provided in the scanner and a second end connected to the frame, and transmits/receives a signal to/from the scanner, the first end facing the second end,
wherein the flat cable extends in the frame such that a width direction of the flat surface is along a direction perpendicular to the lower surface of the placing plate,
wherein the flat cable is subjected to a reinforcement process for increasing a Young's modulus for the width direction of the flat surface,
wherein the flat cable includes a first extension portion extending from the first end, a second extension portion extending from the second end, and a curved portion connecting the first extension portion to the second extension portion, and
wherein the reinforcement process is performed for the first extension portion and the second extension portion of the flat cable and is not performed for the curved portion.

11. The image reading device of claim 10, wherein the cable port of the scanner extends in the direction perpendicular to the lower surface of the placing plate, and
at a side surface of the frame, which is perpendicular to placing plate, a frame fixing part is provided to fix the second end of the flat cable such that the width direction of the flat surface is along the direction perpendicular to the lower surface of the placing plate.

12. The image reading device of claim 10, wherein the cable port of the scanner extends in the main scanning direction,
at the first end of the flat cable, the width direction of the flat surface is along the main scanning direction, and
an end portion of the flat cable including the first end is provided with a first bending portion bent such that the width direction of the flat surface is directed from a direction along the main scanning direction to the direction perpendicular to the lower surface of the placing plate.

13. The image reading device of claim 10, wherein a principal surface of the frame, which faces the placing plate, is provided with a frame fixing part that fixes the second end of the flat cable such that the width direction of the flat surface is along the main scanning direction, and
an end portion of the flat cable including the second end is provided with a second bending portion bent such that the width direction of the flat surface is directed from a direction along the main scanning direction to the direction perpendicular to the lower surface of the placing plate.

14. An image forming apparatus comprising:
the image reading device of claim 10; and
an image forming unit that forms an image read by the image reading device on a recording paper.

\* \* \* \* \*